United States Patent
Lee et al.

(10) Patent No.: US 9,438,469 B2
(45) Date of Patent: Sep. 6, 2016

(54) AUTO-CONFIGURATION SERVER AND MANAGEMENT METHOD OF CUSTOMER PREMISES EQUIPMENTS

(71) Applicant: Industrial Technology Research Institute, Hsinchu (TW)

(72) Inventors: Kuen-Min Lee, Tainan (TW); Jenn-Lien Chu, Kaohsiung (TW); Yu-Tse Lin, Yunlin County (TW); Chin-Yuan Hsiao, Tainan (TW)

(73) Assignee: INDUSTRIAL TECHNOLOGY RESEARCH INSTITUTE, Chutung, Hsinchu (TW)

( * ) Notice: Subject to any disclaimer, the term of this patent is extended or adjusted under 35 U.S.C. 154(b) by 301 days.

(21) Appl. No.: 14/073,285

(22) Filed: Nov. 6, 2013

(65) Prior Publication Data

US 2014/0189101 A1 Jul. 3, 2014

(30) Foreign Application Priority Data

Jan. 2, 2013 (TW) .............................. 102100018 A

(51) Int. Cl.
*G06F 15/16* (2006.01)
*H04L 12/24* (2006.01)
*H04L 12/26* (2006.01)

(52) U.S. Cl.
CPC ......... *H04L 41/044* (2013.01); *H04L 41/0886* (2013.01); *H04L 41/32* (2013.01); *H04L 43/0817* (2013.01); *H04L 41/0213* (2013.01)

(58) Field of Classification Search
CPC .. G06F 3/1205; G06F 3/1219; G06F 3/1239; G06F 3/1255; G06F 3/1289; G06F 11/3476; G06F 11/3495; G06F 12/02; G06F 13/00; G06F 13/385; G06F 15/17331; H04L 41/0869; H04L 41/28; H04L 41/044; H04L 41/32; H04L 41/0886; H04L 43/0817; H04L 41/0213
USPC .................. 709/220, 224–245; 370/310, 431
See application file for complete search history.

(56) References Cited

U.S. PATENT DOCUMENTS 6,748,416 B2 6/2004 Carpenter et al.
7,072,955 B1 7/2006 Huckins
(Continued)

FOREIGN PATENT DOCUMENTS

CN 101729328 B 4/2012
CN 102711097 A 10/2012
(Continued)

OTHER PUBLICATIONS

So et al., "Adaptive neighbor management for cooperative P2P video-on-demand streaming", IEEE 30th International Performance Computing and Communications Conference (IPCCC), 2011, pp. 1-10.
(Continued)

*Primary Examiner* — David Lazaro
*Assistant Examiner* — Berhanu Shitayewoldetsadi
(74) *Attorney, Agent, or Firm* — Muncy, Geissler, Olds & Lowe, P.C.

(57) ABSTRACT

An auto-configuration server (ACS) and a management method of customer premises equipments (CPEs) thereof are provided, and the ACS includes a sub server communication module and a group management module. When an online message is received from a new CPE, the management method includes performing an extension procedure including the following steps. A health value of the ACS is calculated. When the health value of the ACS is less than or equal to a health threshold, a new group and a sub server corresponding to the new group are added and the new CPE is managed by the sub server corresponding to the new group.

38 Claims, 22 Drawing Sheets

(56) References Cited

U.S. PATENT DOCUMENTS

| | | | |
|---|---|---|---|
| 7,694,007 | B1 | 4/2010 | Dubrovsky et al. |
| 8,000,345 | B2 | 8/2011 | Blackford et al. |
| 8,010,842 | B2 | 8/2011 | Krivopaltsev et al. |
| 8,024,450 | B1 | 9/2011 | Shiyafetdinov et al. |
| 2009/0067354 | A1* | 3/2009 | Gao ............... H04W 72/085 370/310 |
| 2009/0138578 | A1* | 5/2009 | Wu ..................... H04L 12/24 709/220 |
| 2010/0088410 | A1* | 4/2010 | Ridley ............ H04L 41/0896 709/224 |
| 2011/0010543 | A1* | 1/2011 | Schmidt ............. H04W 12/10 713/168 |
| 2011/0016183 | A1* | 1/2011 | Coppens ........... H04L 41/0806 709/206 |
| 2011/0208698 | A1* | 8/2011 | Fang .................... H04L 41/00 707/634 |
| 2012/0106346 | A1 | 5/2012 | Aguirre et al. |
| 2014/0126581 | A1* | 5/2014 | Wang ................. H04W 4/001 370/431 |

FOREIGN PATENT DOCUMENTS

| | | |
|---|---|---|
| TW | 200950539 A | 12/2009 |
| TW | 201145906 | 12/2011 |
| WO | WO2009101077 A1 | 8/2009 |

OTHER PUBLICATIONS

Cruz et al., "CWMP extensions for enhanced management of domestic network services", 35th Annual IEEE Conference on Local Computer Networks, 2010, pp. 180-183.

Fukuda et al., "Dependency of Network Structures in Agent Selection and Deployment", Proceedings of the IEEE/WIC/ACM International Conference on Intelligent Agent Technology (IAT'06), 2006, 8 pages.

Wannachakrit et al., "Development of network management system for network services provider", 5th Malaysian Conference in Software Engineering (MySEC), 2011, pp. 439-444.

Vleeschauwer et al., "On the Enhancement of QoE for IPTV Services through Knowledge Plane Deployment", BroadBand Europe, Dec. 11-14, 2006, pp. 1-6.

\* cited by examiner

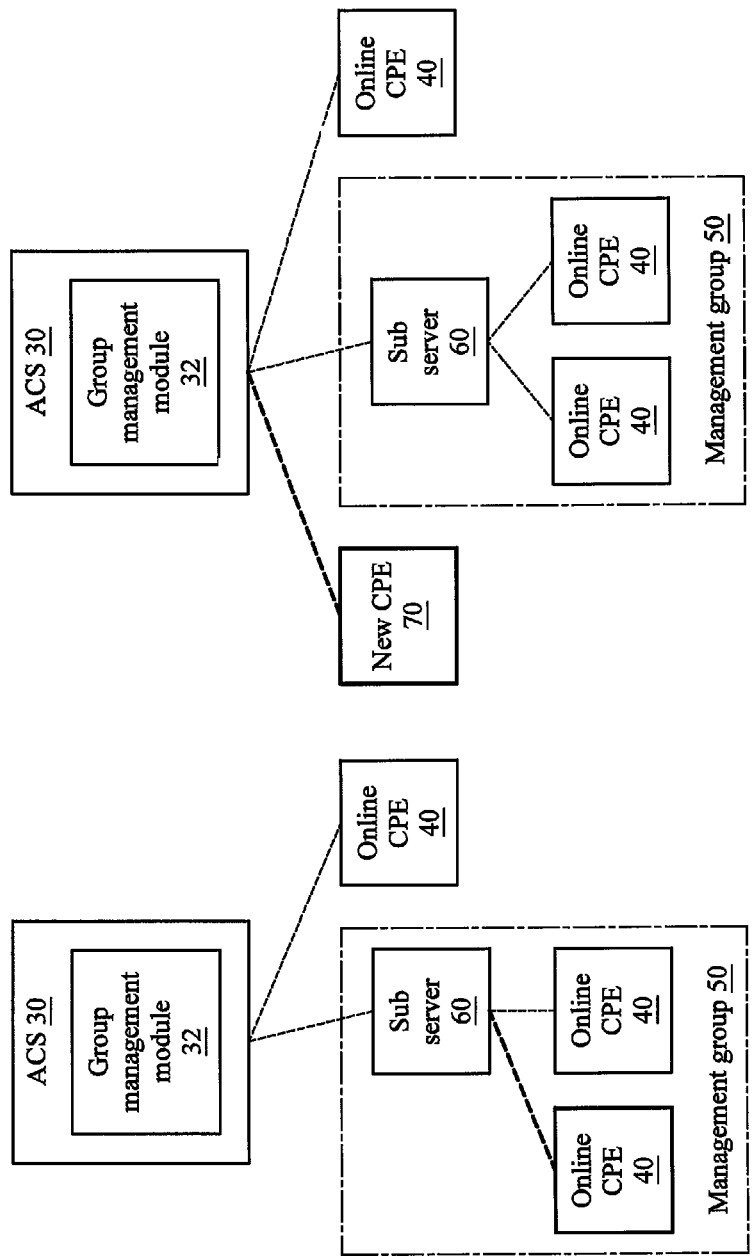

AUTO-CONFIGURATION SERVER AND MANAGEMENT METHOD OF CUSTOMER PREMISES EQUIPMENTS

CROSS-REFERENCE TO RELATED APPLICATIONS

This non-provisional application claims priority under 35 U.S.C. §119(a) on Patent Application No(s). 102100018 filed in Taiwan, R.O.C. on Jan. 2, 2013, the entire contents of which are hereby incorporated by reference.

TECHNICAL FIELD

The disclosure relates to an auto-configuration server (ACS) and a management method of customer premises equipments (CPEs) thereof.

BACKGROUND

Telecommunications operators and network communication service suppliers build up relative hardware equipment for providing customers or end-users with their services. Recently, the CWMP is the most widespread remote management protocol for remote management of end-users' network communication devices.

Under the CWMP, one central ACS can manage many CPEs, and the ACS and each CPE can communicate with each other through the CWMP. Whenever the ACS commands and accesses the CPEs through the CWMP, the ACS has to use several data packages under a simple object access protocol (SOAP) and several requests under a hypertext transport protocol (HTTP).

However, the bandying of multiple commands or requests makes the communication require a lots of connection time. More particularly, if a current connection quantity of the ACS has been up to a maximum connection threshold, an off-line CPE has to wait for one existed connection to end, and then connects to the ACS for the information transmission. This will reduce the timeliness of a management system. That is why the telecommunications operators have to build up more ACSes for increasing a total of connections. Nevertheless, this will cause a great deal of the equipment cost.

SUMMARY

A management method of CPEs, adapted to manage a plurality of online CPEs via an ACS, includes the following steps. When an online message is received from a new CPE, an extension procedure is performed and includes the following steps. A health value of the ACS is calculated. When the health value of the ACS is less than or equal to a health threshold, a new group and a sub server corresponding to the new group are added, and the new CPE is managed via the sub server corresponding to the new group.

An ACS for managing a plurality of online CPEs includes a group management module performing an extension procedure when receiving an online message from a new CPE. In the extension procedure, a health value of the ACS is calculated. When the health value of the ACS is less than or equal to a health threshold, a new group and a sub server corresponding to the new group are added and the new CPE is managed via the sub server corresponding to the new group.

BRIEF DESCRIPTION OF THE DRAWINGS

The present disclosure will become more fully understood from the detailed description given herein below for illustration only and thus does not limit the present disclosure, wherein:

FIG. 8A to FIG. 8C show a schematic management diagram of adding a new CPE according to an embodiment of the disclosure;

FIG. 9A to FIG. 9C show a schematic management diagram of adding a new CPE according to an embodiment of the disclosure;

DETAILED DESCRIPTION

Figure 1B:
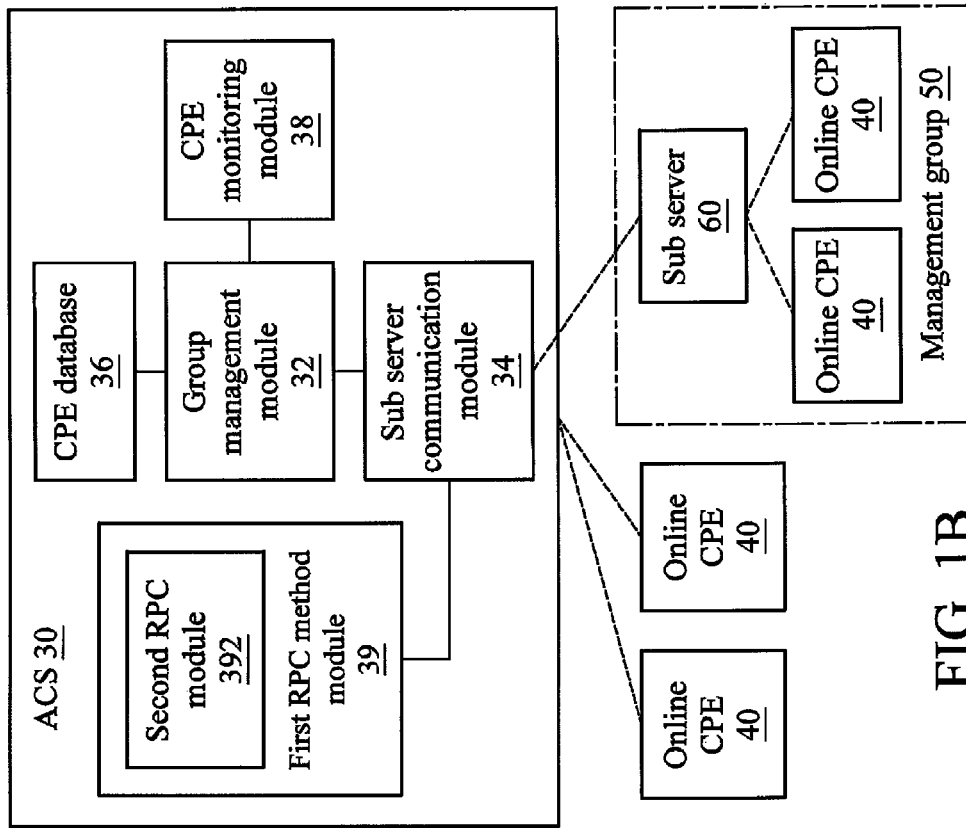
FIG. 1B is a block diagram of an ACS according to an embodiment of the disclosure.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

The disclosure relates to an ACS and a management method of CPEs thereof. The disclosure performs the management method by using an ACS to managing many online CPEs, and the ACS and each CPE communicate with each other under a CWMP or a TR-069 standard protocol.

Figure 1A:
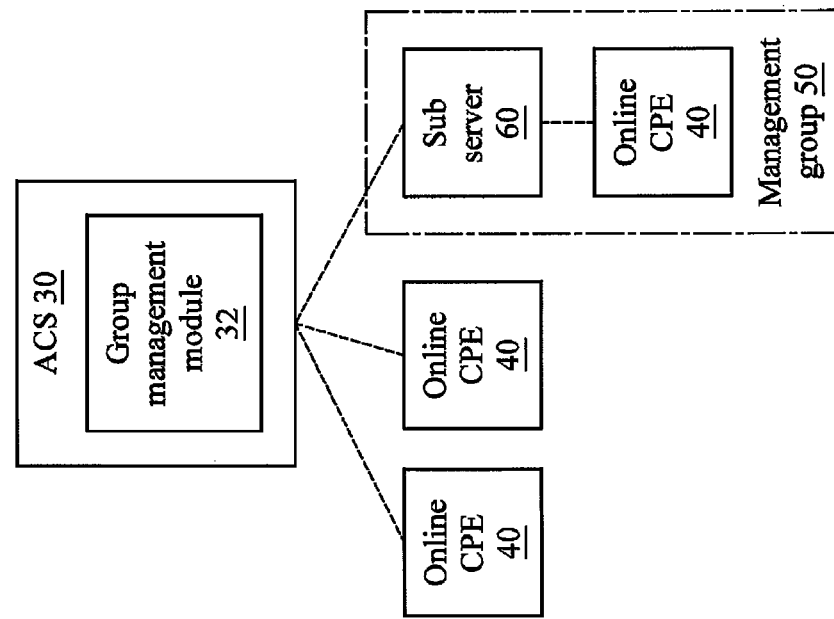
FIG. 1A is a block diagram of an ACS according to an embodiment of the disclosure.

FIG. 1A is a block diagram of an ACS according to an embodiment of the disclosure. The ACS 30 includes a group management module 32 for performing the management method of CPEs 40. The ACS 30 can wiredly or wirelessly send various commands to each online CPE 40 through the CWMP, or receive necessary information from the online CPEs 40. Specifically, the ACS 30 groups a part of the online CPEs 40 into many management groups 50, and each management group 50 includes at least one of the online CPEs 40. One of the at least one online CPE 40 in each management group 50 is set as a sub server 60 which can replace the ACS 30 to transfer a management command for managing the remaining of the online CPEs 40 in each management group 50, so as to increase a quantity of CPEs 40 which ACS 30 can simultaneously assess.

Subsequently, the group management module 32 performs an extension procedure, a deleting procedure or an altering procedure, whereby the ACS 30 can dynamically change topology of the management groups 50. The ACS 30 performs the extension procedure to add a new CPE to be one of the online CPEs 40. Moreover, the ACS 30 in the extension procedure may set a new sub server 60, and add a new group in the existed network topology to be a new management group 50. The ACS 30 directly manages the sub servers 60 and a part of the online CPEs 40, and via the sub servers 60, indirectly manages the online CPEs 40 in each management group 50 belonging to the sub server 60. Therefore, this topology seems like a tree structure.

In order to manage every online CPE 40 and every management group 50, the ACS 30 further maintains an ACS management list which records the management groups 50 that all the online CPEs 40 belong to, and a parent node of each of the online CPEs 40. Thus, the ACS management list can be considered as a distribution structure that records these grouped online CPEs 40. The parent node of the online CPEs 40 may be the ACS 30 or be one of the sub servers 60. Similarly, each sub server 60 maintains its sub management list, and every sub management list records the online CPEs 40 managed by its corresponding sub server 60.

Figure 2:
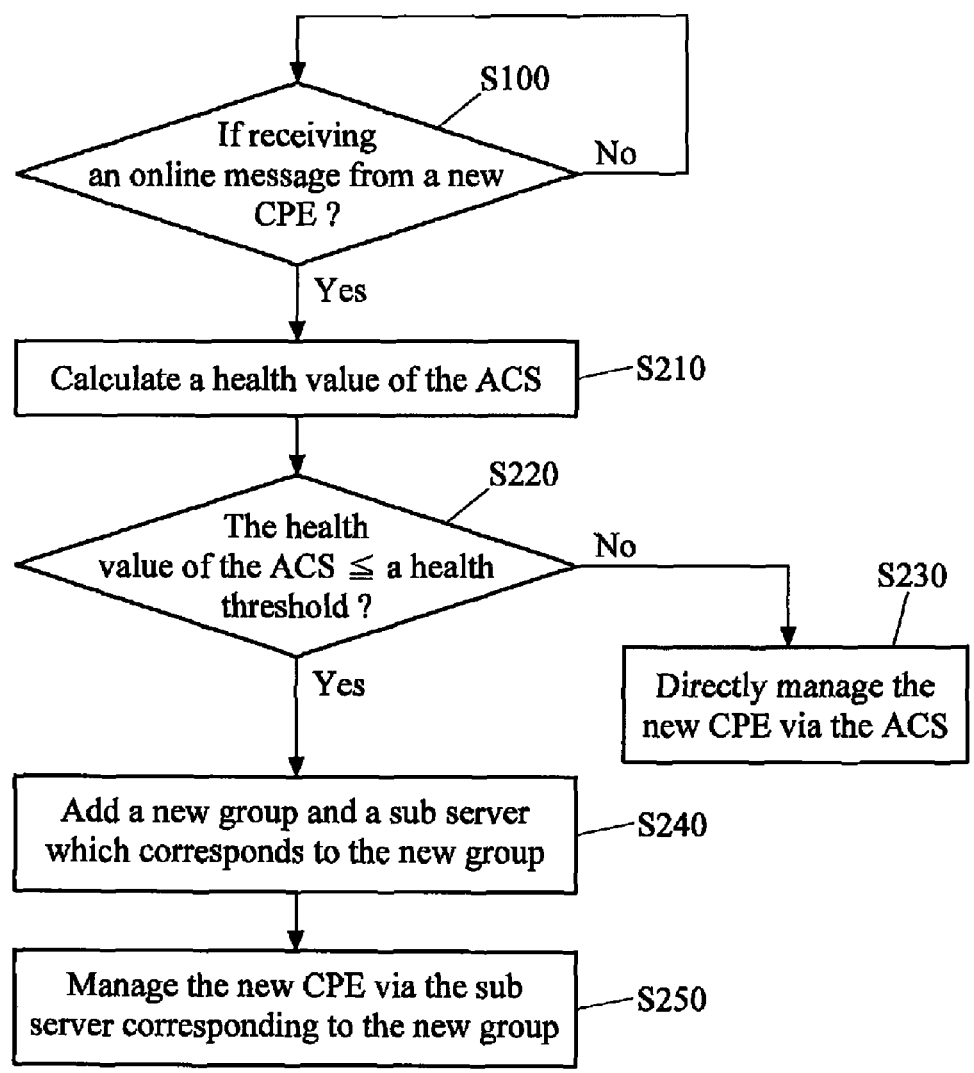
FIG. 2 is a flowchart of a management method of CPEs according to an embodiment of the disclosure.

The detail that the group management module 32 in the extension procedure adds one sub server 60 is illustrated as follows. FIG. 2 is a flowchart of a management method of CPEs according to an embodiment of the disclosure. Firstly, the group management module 32 determines whether an online message is received from a new CPE (step S100). After receiving the online message, the group management module 32 performs the extension procedure in which the group management module 32 can first calculate a health value of the ACS 30 (step S210) and then determine whether the health value of the ACS 30 is less than or equal to a health threshold (step S220).

The health value represents the remaining processing capacity of the ACS 30. In an embodiment, the ACS 30 can calculate the health value according to it's a memory usage, a central processing unit (CPU) usage and a bandwidth usage. The memory usage represents the current usage state of a memory of the ACS 30. For instance, the memory usage will be 0.6 if sixty percent of the memory capacity has been used. Similarly, the CPU usage and the bandwidth usage represent the current usage state of a CPU of the ACS 30 and the current usage state of the network bandwidth of the ACS 30 respectively. Specifically, the ACS 30 calculates the health value as follows:

$$F_{health} = w_{h1} \times \sqrt[2]{(1-U_m) \times R_m} + \\ w_{h2} \times \sqrt[2]{(1-U_p) \times R_p} + w_{h3} \times \sqrt{(1-U_b) \times R_b} ; \qquad (1)$$

where $F_{health}$ represents the health value, $w_{h1}$, $w_{h2}$ and $w_{h3}$ represent weight values, $U_m$ represents the memory usage of the ACS 30, $R_m$ represents a memory rank value of the ACS 30, $U_p$ represents the CPU usage of the ACS 30, $R_p$ represents a CPU rank value of the ACS 30, $U_b$ represents the bandwidth usage of the ACS 30, $R_b$ represents a bandwidth rank value of the ACS 30, $w_{h1}+w_{h2}+w_{h3}=1$, and $0 \leq F_{health} \leq 1$. The memory rank value, CPU rank value and bandwidth rank value of the ACS 30 can be default values or be defined by users. For example, the memory rank value of a memory having the memory capacity of 1 gigabyte (GB) is defined as 0.3, and the memory rank value of a memory having the memory capacity of 2 GB is defined as 0.6.

Figure 3B:
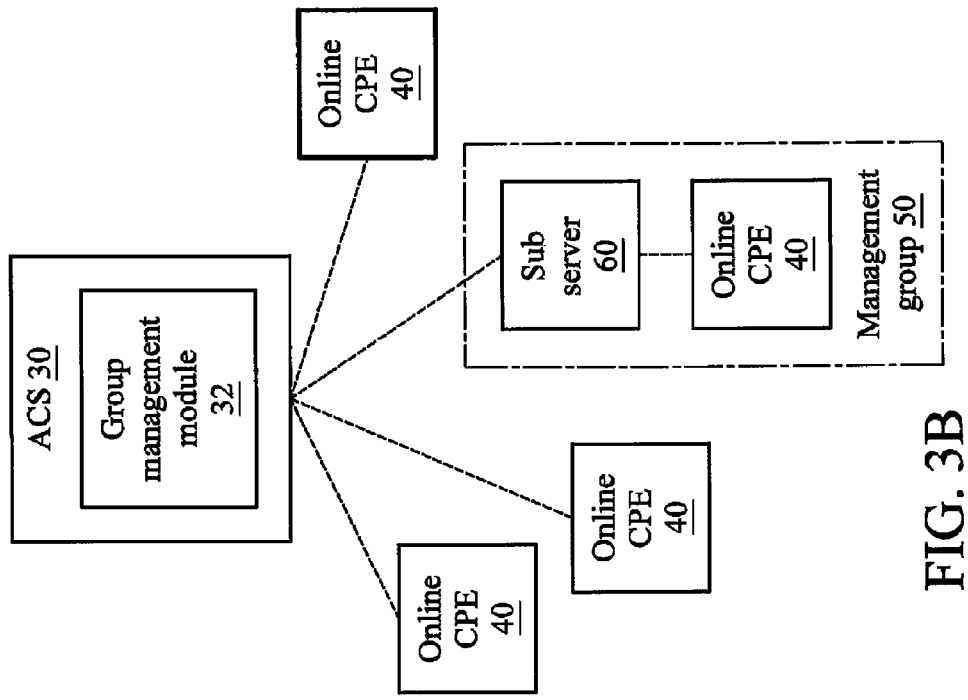
FIG. 3A and FIG. 3B show a schematic management diagram of adding a new CPE according to an embodiment of the disclosure.
Figure 3A:
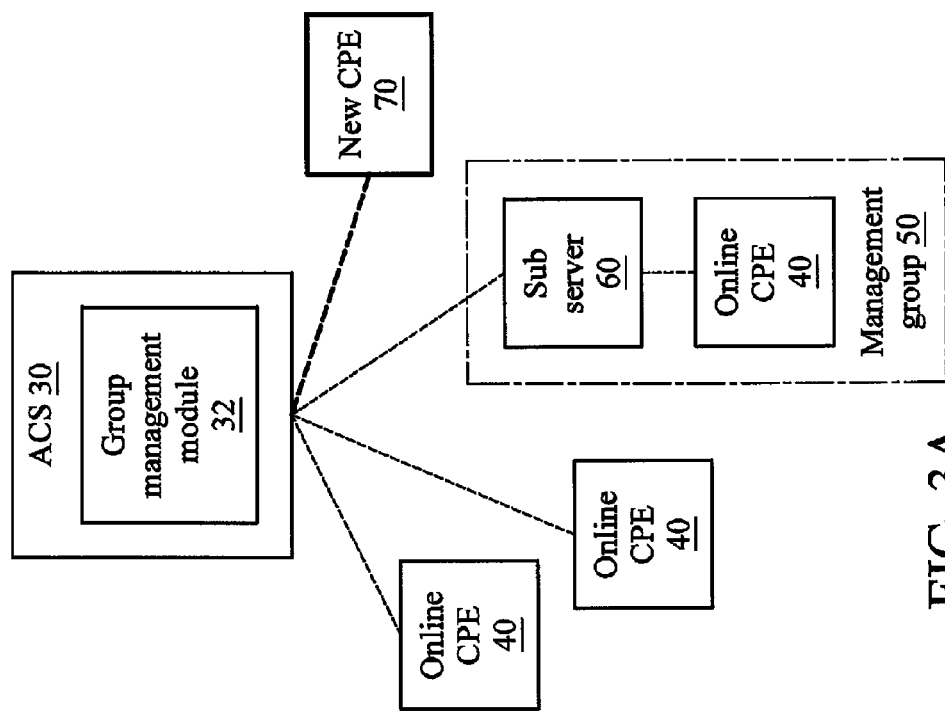
Figure 4B:
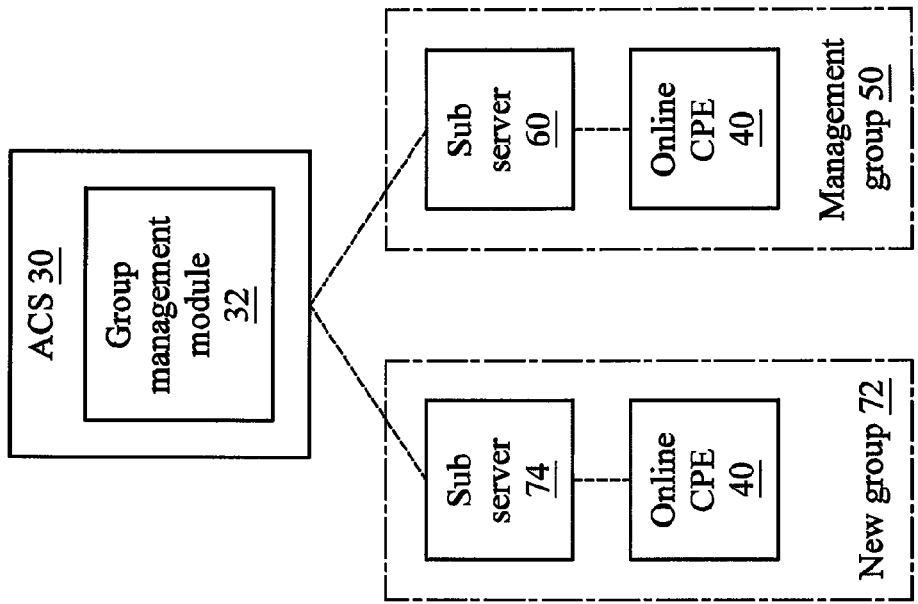
FIG. 4A and FIG. 4B show a schematic management diagram of adding a new CPE according to an embodiment of the disclosure.
Figure 4A:
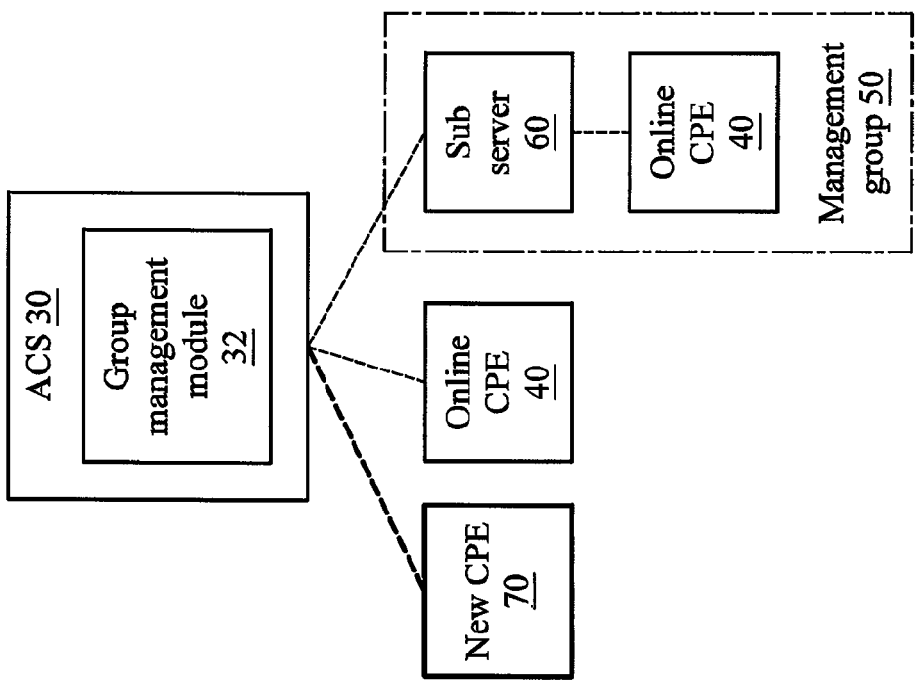

Therefore, when the health value of the ACS 30 is greater than the health threshold, it indicates that the current loading of the ACS 30 is not too much. Herein, the new CPE 70 can be recorded into the ACS management list and directly be managed by the ACS 30 (step S230). That is, this new CPE 70 can be regarded as a new online CPE 40 as shown in FIG. 3A and FIG. 3B, which is directly managed by the ACS 30. In contrast, when the health value of the ACS 30 is less than or equal to the health threshold, the ACS 30 can add a new group 72 and a sub server 74 both of which correspond to each other (step S240), and then manage the new CPE 70 via the sub server 74 corresponding to the new group 72 as shown in FIG. 4A and FIG. 4B (step S250). The new group 72 is regarded as one new management group 50, and the sub server 74 corresponding to the new group 72 is regarded as one new sub server 60. That is, the new CPE 70 can be set as one new online CPE 40 managed by the sub server 74.

In this way, whenever the remaining processing capacity of the ACS 30 is low, one of the online CPEs 40 can be set as one new sub server 60 which can manage the new CPE 70, thereby reducing the loading of the ACS 30.

Figure 5:
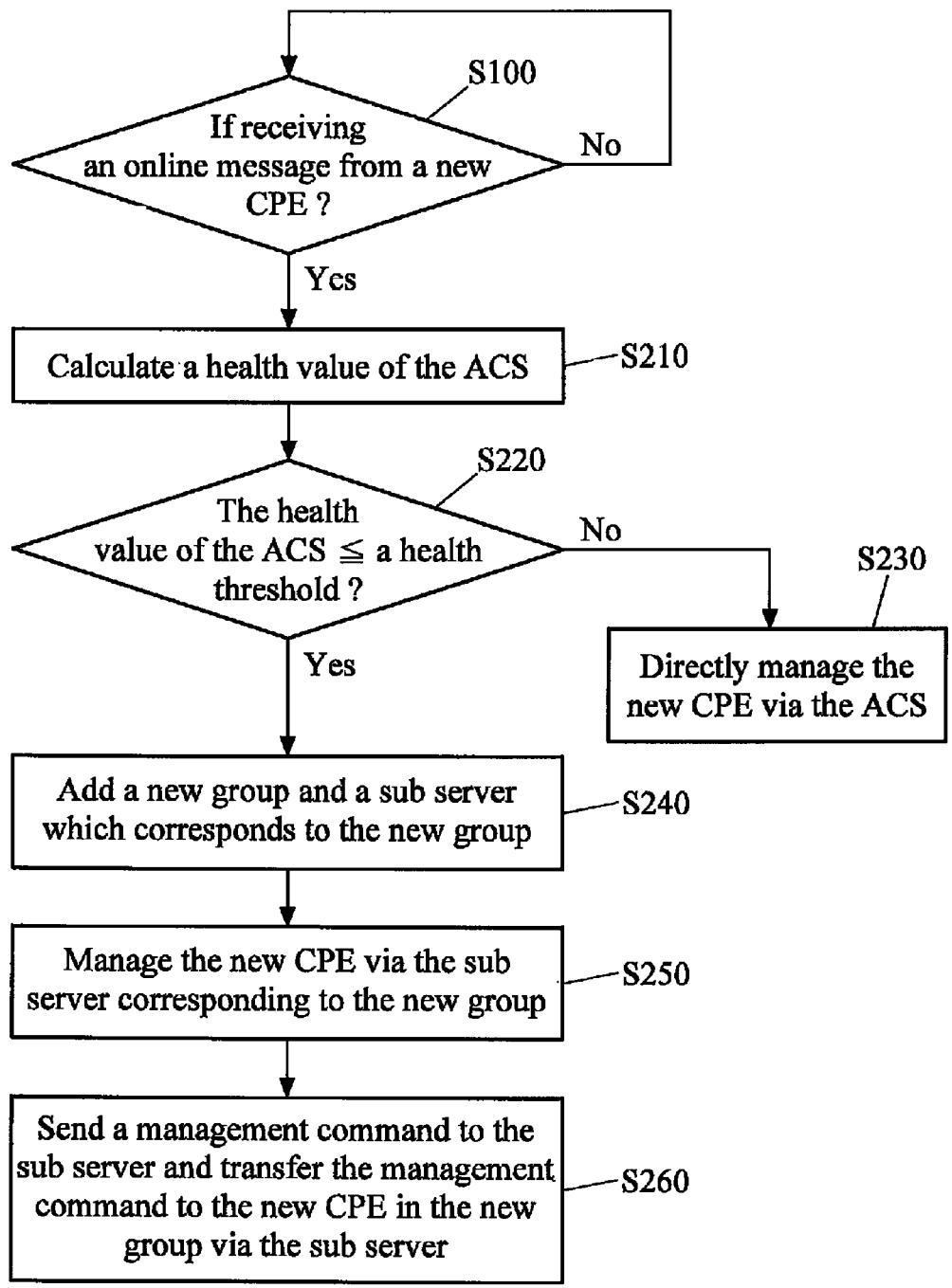
FIG. 5 is a flowchart of a management method of CPEs according to an embodiment of the disclosure.

FIG. 5 is a flowchart of a management method of CPEs according to an embodiment of the disclosure. After the new CPE 70 is added in a management system including the ACS 70 and the online CPEs 40, the ACS 30 sends a management command to the sub server 74, and then the sub server 74 further transfers the management command to the new CPE 70 in the new group 72 (step S260). In other words, the ACS 30 sends the management command to all the online CPEs 40 which are directly managed by the ACS 30, and to all the sub servers 60, so each sub server 60 can further transfer the management command to all the online CPEs 40 which are managed by the sub server 60.

According to an embodiment of the disclosure, the ACS 30 can further include a sub server communication module 34, a CPE database 36, a CPE monitoring module 38 and a remote procedure call (RPC) method module 39 as shown in FIG. 1B. The sub server communication module 34 can communicate with the sub server 60.

The first RPC method module 39 in an exemplary embodiment performs a CWMP, a TR-069 standard protocol or other RPC methods supported by other compatible standard protocols. Through the RPC methods, the ACS 30 can communicate with the online CPEs 40 which are directly managed by the ACS 30, the online CPEs 40 which are set as the sub servers 60, and the online CPEs 40 which are managed by the sub servers 60. The first RPC method module 39 can further include a second RPC method module 392 which supports various RPC methods through which the ACS 30 can communicate with every management group 50. Through the sub server communication module 34 and the second RPC method module 392, the ACS 30 can send a command group for managing the dynamic network topology, or send other management commands for other universal usages, to the sub server 60 in each management group 50.

The CPE database 36 stores an ACS management list and the information about the processing capacity and character of each online CPE 40. In an embodiment, the CPE database 36 can further store a candidate list corresponding to various management groups. The candidate list respectively records whether each of the management groups corresponds to any candidate CPE which is one of the online CPEs. The candidate CPE is the online CPE 40 which has enough processing capacity and can be set as the sub server 60. In other words, the candidate list records information that represents which online CPE 40 can potentially be the sub server 60. Generally, all the sub servers 60 are recorded in the candidate list as well.

The CPE monitoring module 38 can monitor a current quantity of the online CPEs 40 and the processing capacity and data model of each online CPE 40, and can provide such information to the group management module 32. The data model represents the type of the online CPE 40 and can be a parameter under the CWMP. The data model can be a TR-104 (voice over Internet Protocol data model, VoIP DM), a TR-135 (set top box data model, STB DM) or a TR-098 (internet gateway devices data model, IGD DM).

The group management module 32 is initially preset to group the CPEs 40 according to the data models of the online CPEs 40. The ACS 30 sends various management commands and sets various parameters according to various data models, so the online CPEs 40 having the same data model are grouped together and then managed together, whereby the management efficiency may be increased.

Figure 6:
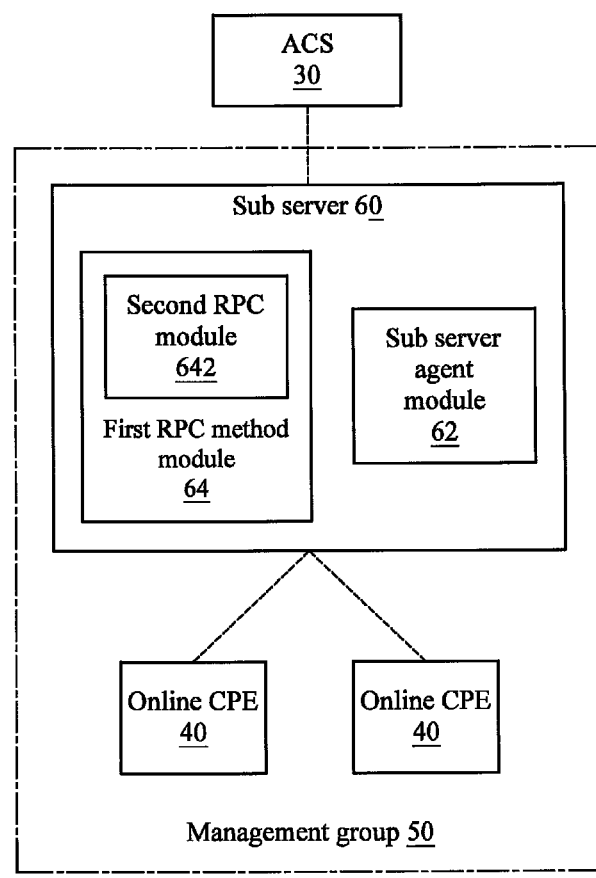
FIG. 6 is a block diagram of a sub server according to an embodiment of the disclosure.

FIG. 6 is a block diagram of a sub server according to an embodiment of the disclosure. The sub server 60 includes a sub server agent module 62 and a first RPC method module 64. The first RPC method module 64 performs a CWMP, a TR-069 standard protocol or the RPC methods supported by other compatible standard protocols. Thus, the sub server agent module 62 can communicate with the ACS 30 by using these RPC methods. The first RPC method module 64 includes a second RPC method module 642 which supports the RPC methods through which the sub server 60 can communicate with the management groups 50. Moreover, the second RPC method module 642 can allow the sub server 60 to set the management group 50 corresponding to the sub server 60, or can answer the ACS 30 after collecting information of the online CPEs 40 under work.

The sub server agent module 62 manages its management group 50 and via the second RPC method module 642, communicates with its managed online CPEs 40. Moreover, the sub server agent module 62 can monitor its statuses such as the memory capacity, CPU capacity and network bandwidth of the sub server 60 as well. If the efficiency of the sub server 60 is too low, the sub server agent module 62 will actively report this situation to the ACS 30 in real time, and trigger an altering procedure for reducing its loading.

Figure 7:
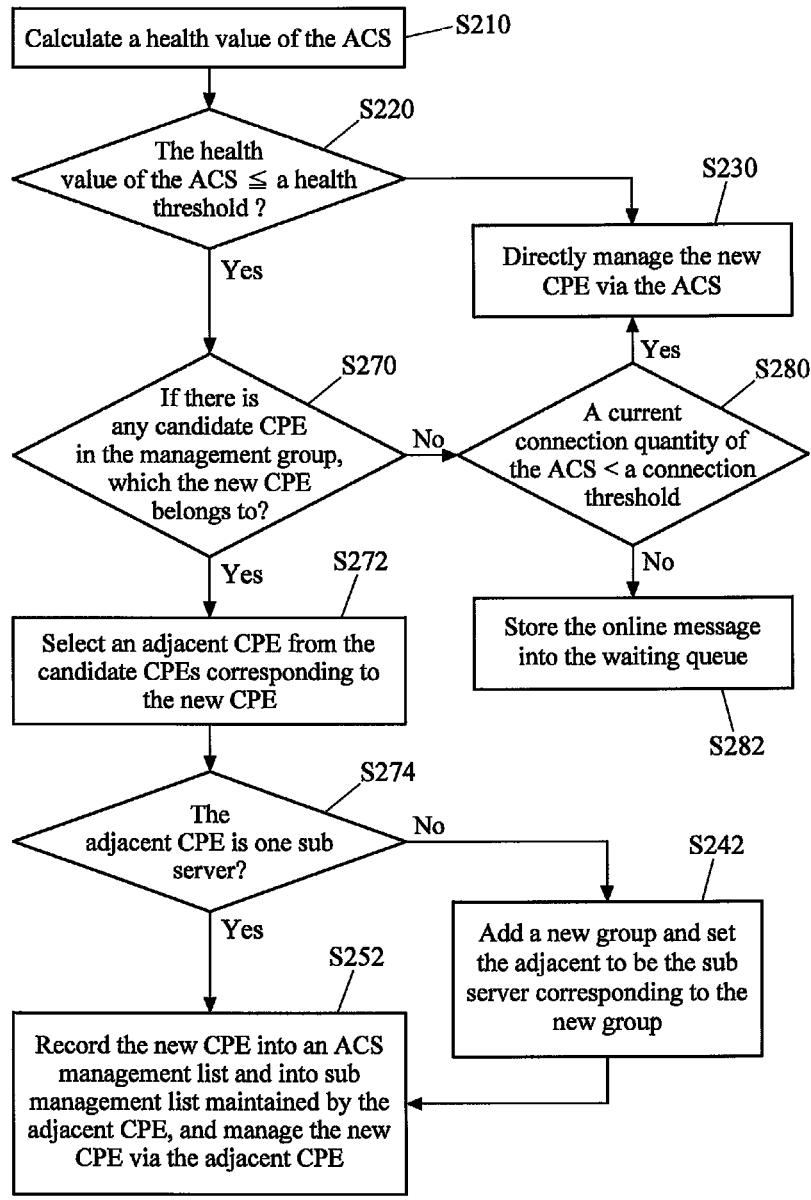
FIG. 7 is a flowchart of an extension procedure according to an embodiment of the disclosure.

FIG. 7 is a flowchart of an extension procedure according to an embodiment of the disclosure. After receiving the online message, the group management module 32 first groups a new CPE 70 according to the data model of the new CPE 70. Then, the group management module 32 lets the ACS 30 manage the new CPE 70, or adds one new group 72 and one sub server 74 both of which correspond to each other for managing the new CPE 70, or lets one existed sub server 60 manage the new CPE 70.

When the health value of the ACS 30 is less than or equal to the health threshold, the group management module 32 can check the candidate list according to the data model of the new CPE 70 to determine whether the new CPE 70 corresponds to any candidate CPE (step S270). When the health value of the ACS 30 is less than or equal to the health threshold and the new CPE 70 corresponds to at least one candidate CPE, the group management module 32 selects an adjacent CPE from the at least one candidate CPE corresponding to the new CPE 70 (step S272), and determines whether the selected adjacent CPE is one sub server 60 (step S274).

Figures 8A, 8B:
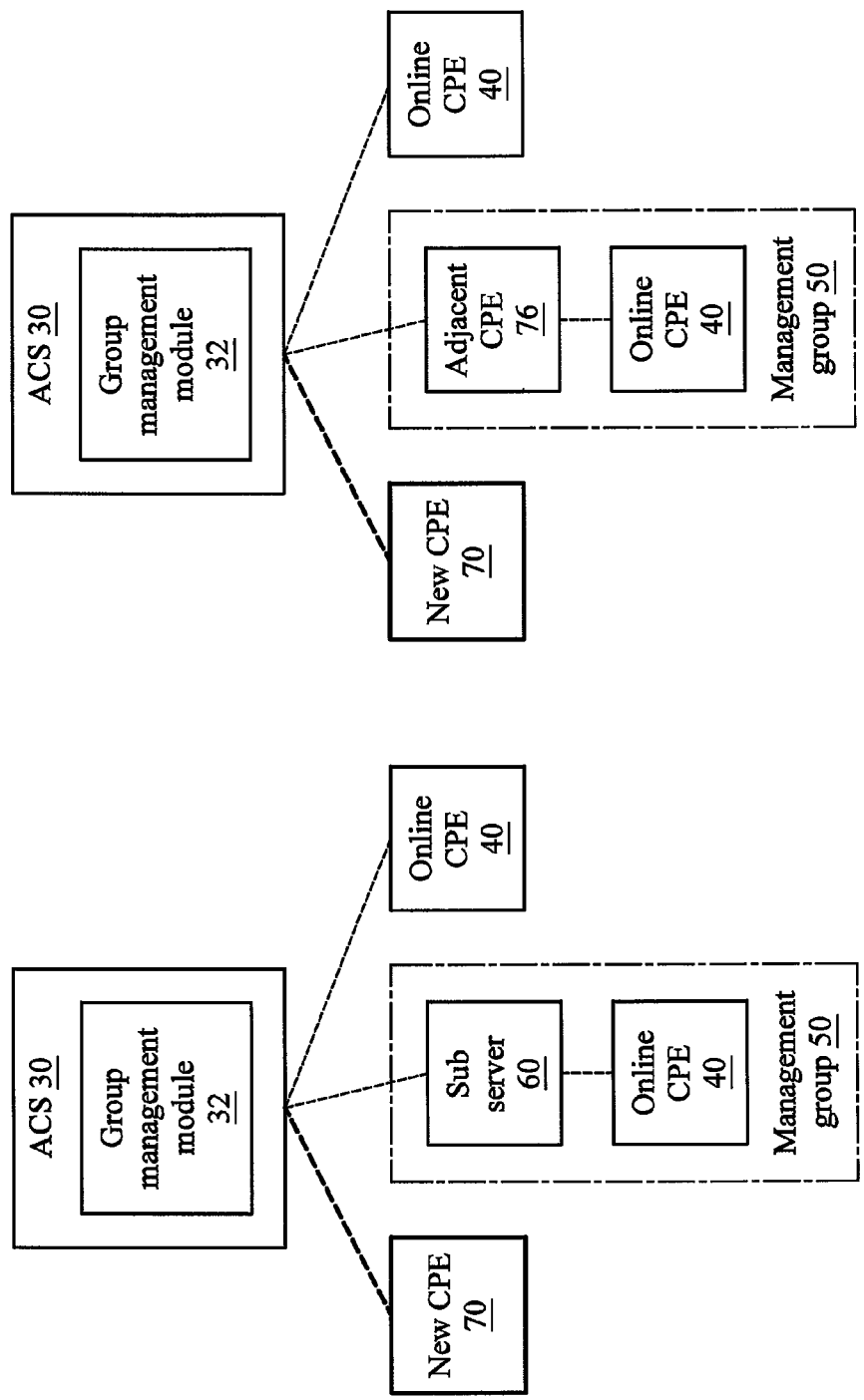

If the selected adjacent CPE 76 is one sub server 60, this sub server 60 will directly manage the new CPE 70. Herein, this new CPE 70 will be recorded in the ACS management list and in the sub management list maintained by the adjacent CPE 76, and the adjacent CPE 76 manages this new CPE 70 (step S252). In FIG. 8A and FIG. 8B, the selected adjacent CPE 76 is one of the existed sub servers 60, so this existed sub server 60, i.e. the selected adjacent CPE 76, can manage the new CPE 70 as shown in FIG. 8C. In other words, the new CPE 70 is set as a new online CPE 40 managed by this existed sub server 60.

Figures 9B, 9C:
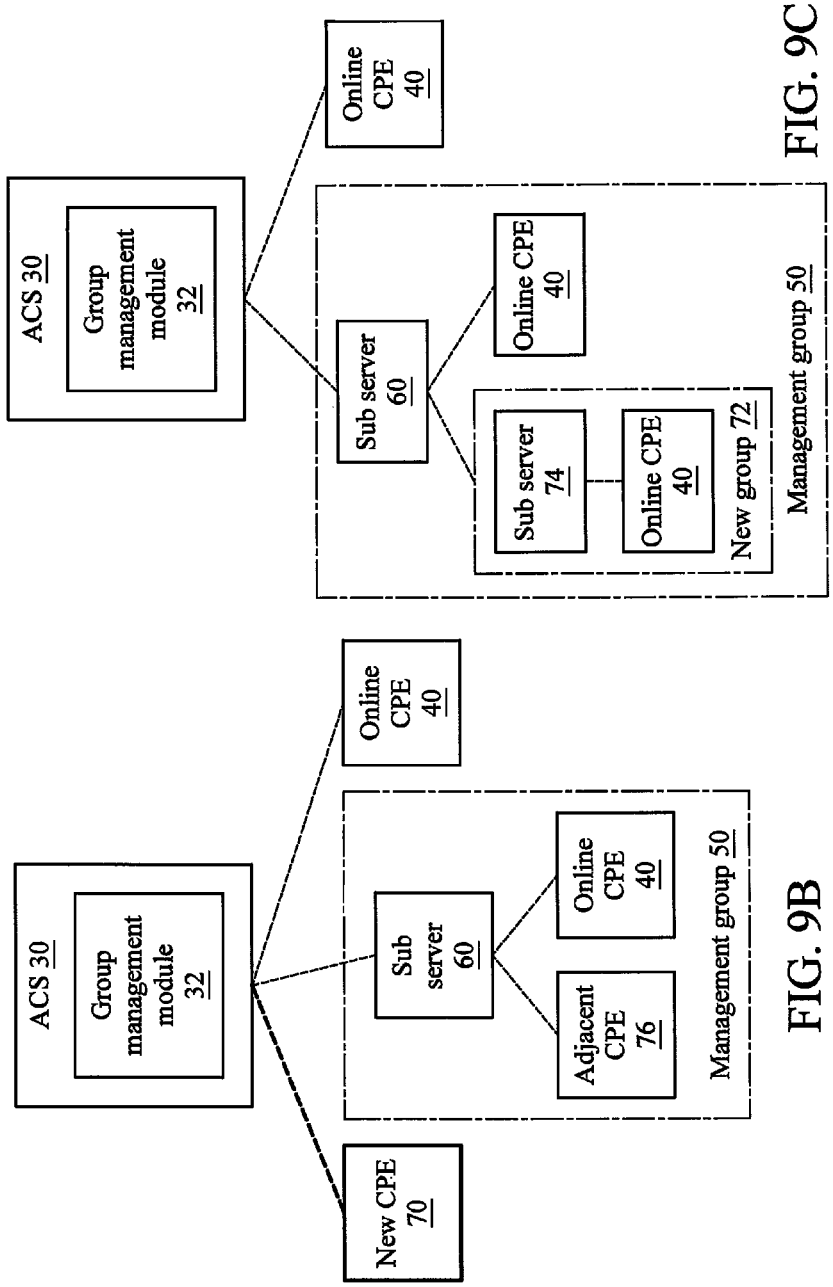

Refer to FIG. 9A and FIG. 9B, one online CPE 40 regarded as the candidate CPE may be selected to be the adjacent CPE 76. If the adjacent CPE 76 is managed by the sub server 60, a new group 72 will be added, and then the adjacent CPE 76 is set as the sub server 74 corresponding to the new group 72 (step S242). Then, the new CPE 70 is recorded in the ACS management list and in the sub management list maintained by the adjacent CPE 76, and the adjacent CPE 76 further manages the new CPE 70 (step S252), as shown in FIG. 9C. In other words, the new CPE 70 is regarded as one new online CPE 40 managed by the new sub server 74.

On the other hand, a dynamic network protocol supports a tree structure having multiple layers, where one sub server 60 can manage the sub servers 60 in secondary layer and one management group 50 includes one or more management groups 50 in a secondary layer. In the extension procedure, if the selected adjacent CPE 76 is the online CPE 40 directly managed by the ACS 30, the new group 72 including the selected adjacent CPE 76, and the sub server 74 regarded as the adjacent CPE 76 are directly managed by the ACS 30. In contrast, if the selected adjacent CPE 76 is one online CPE 40 in one existed management group 50, the new group 72 including the adjacent CPE 76, and the sub server 74 regarded as the adjacent CPE 76 are managed by the sub server 60 of the management group 50 that the new group 72 and the sub server 74 belong to, as shown in FIG. 9C.

If the health value of the ACS 30 is less than or equal to the health threshold, and the management group that the new CPE 70 belongs to does not correspond to any candidate CPE, the group management module 32 will further determine whether a current connection quantity of the ACS 30 is less than a connection threshold (step S280). The current connection quantity is equal to a quantity of the online CPEs 40 directly managed by the ACS 30, plus a quantity of the sub servers 60 directly connecting to the ACS 30.

Figure 10B:
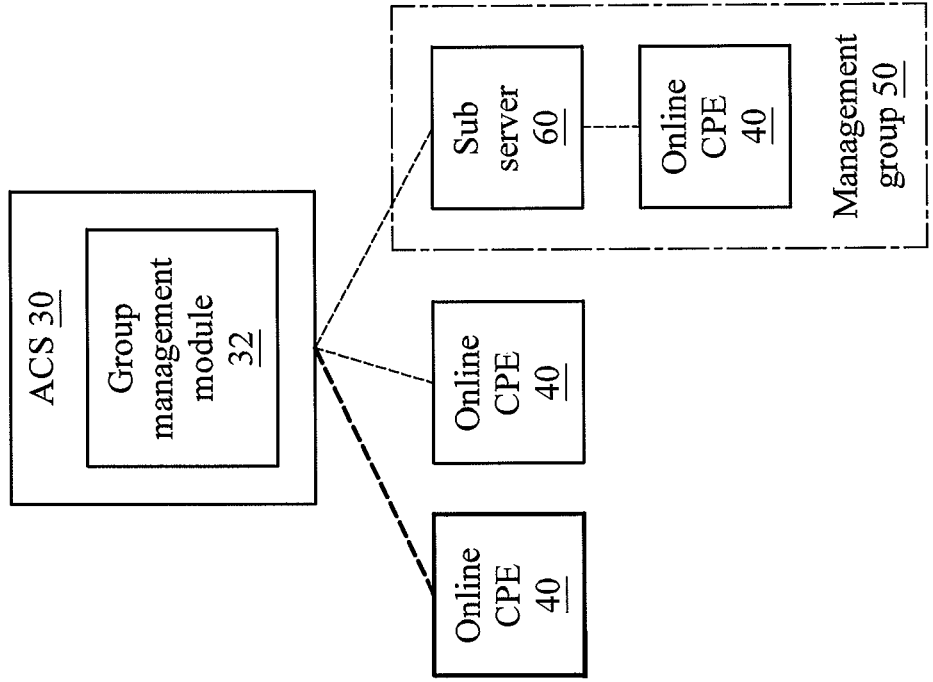
FIG. 10A and FIG. 10B show a schematic management diagram of adding a new CPE according to an embodiment of the disclosure.
Figure 10A:
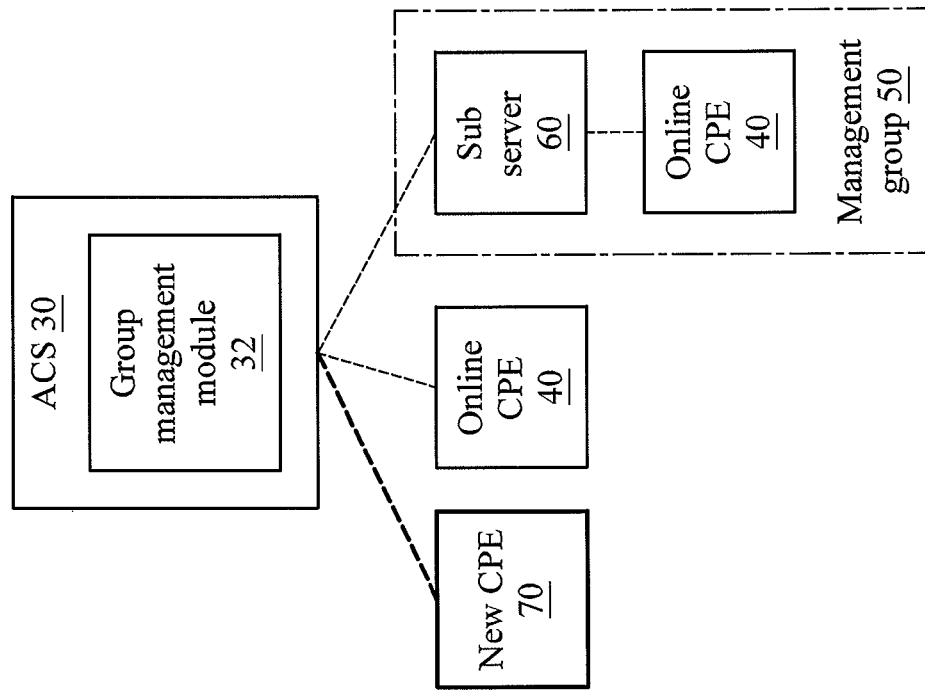

When the current connection quantity of the ACS 30 is less than the connection threshold, it means that the loading of the ACS 30 has not been up to its upper limitation yet. Even though the ACS 30 has much loading, the new CPE 70 can still be recorded in the ACS management list and directly managed by the ACS 30 (step S230). That is, the new CPE 70 can be one new online CPE 40 directly managed by the ACS 30, as shown in FIG. 10A and FIG. 10B. In contrast, when the current connection quantity of the ACS 30 is greater than or equal to the connection threshold, it means that the ACS 30 can not bear the new CPE 70. Therefore, the online message will be stored in a waiting queue (step S282). Once this online message is read out from the waiting queue, the extension procedure will be triggered again and then the ACS 30 adds the new CPE 70 in the system.

Figure 11:
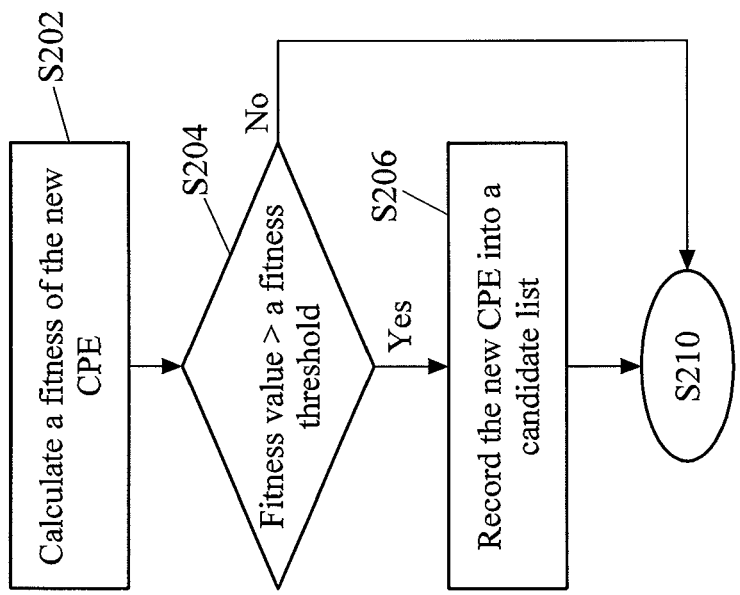
FIG. 11 is a flowchart of an extension procedure according to an embodiment of the disclosure.

In an embodiment, the ACS 30 can calculate a fitness value of each online CPE 40, for determining which online CPE 40 is available to be the sub server 60. FIG. 11 is a flowchart of an extension procedure according to an embodiment of the disclosure. This embodiment further includes the steps S202 to S206 before the step S210, for calculating the fitness value of each online CPE 40 before the online CPE 40 joins the system.

When the extension procedure starts, the CPE monitoring module 38 in the ACS 30 acquires some information about the processing capacity and data model of the new CPE 70 and transfers the information to the group management module 32. The group management module 32 then calculates the fitness value of the new CPE 70 as follows (step S202), $$F_{fitness} = w_{f1} \times \sqrt[2]{(1 - U_m) \times R_m} + \\ w_{f2} \times \sqrt[2]{(1 - U_p) \times R_p} + w_{f3} \times \sqrt[2]{(1 - U_b) \times R_b} + w_{f4} \times |R_o|; \quad (2)$$

wherein $F_{fitness}$ represents the fitness value, $w_{f1}$, $w_{f2}$, $w_{f3}$ and $w_{f4}$ represent weight values, $U_m$ represents the memory usage of the new CPE 70, $R_m$ represents the memory rank value of the new CPE 70, $U_p$ represents the CPU usage of the new CPE 70, $R_p$ represents the CPU rank value of the new CPE 70, $U_b$ represents the bandwidth usage of the new CPE 70, $R_b$ represents the bandwidth rank value of the new CPE 70, Ro represents an online time rank value of the new CPE 70, $w_{f1}+w_{f2}+w_{f3}+w_{f4}=1$, and $0 \leq F_{fitness} \leq 1$. The memory rank value, CPU rank value, bandwidth rank value and online time rank value of the new CPE 70 can be default values or be defined by administrators. For example, the online time rank value can be defined according to the online time when the new CPE 70 connects to the ACS 30. For example, the online time rank value can be set by classifying the hours of online time.

After obtaining the fitness value of the new CPE 70, the group management module 32 determines whether the fitness value of the new CPE 70 is greater than a fitness threshold (step S204). If the fitness value of the new CPE 70 is greater than the fitness threshold, the group management module 32 will record the new CPE 70 in the candidate list (step S206) and then perform the step S210.

In the steps S270 and S272, the group management module 32 can according to the candidate list, know whether the new CPE 70 corresponds to any candidate CPE, so as to select an adjacent CPE 76. In the step S272, the group management module 32 randomly selects one of the at least one candidate CPE corresponding to the new CPE 70. If a distance between the selected candidate CPE and the new CPE 70 is less than a distance threshold, this candidate CPE can be the adjacent CPE 76. The distance between the selected candidate CPE and the new CPE 70 in an embodiment is a Hop distance, that is, the quantity of hubs or switches when the candidate CPE and the new CPE 70 connect to each other through a network. In other words, the group management module 32 can select the candidate CPE which connects to the new CPE 70 through the network more fast, to be the adjacent CPE 76.

Moreover, the ACS 30 can calculate the fitness values of the existed online CPEs 40. The fitness value includes the memory usage, memory rank value, CPU usage, CPU rank value, bandwidth usage, bandwidth rank value and online time rank value of the online CPE 40.

Figure 12:
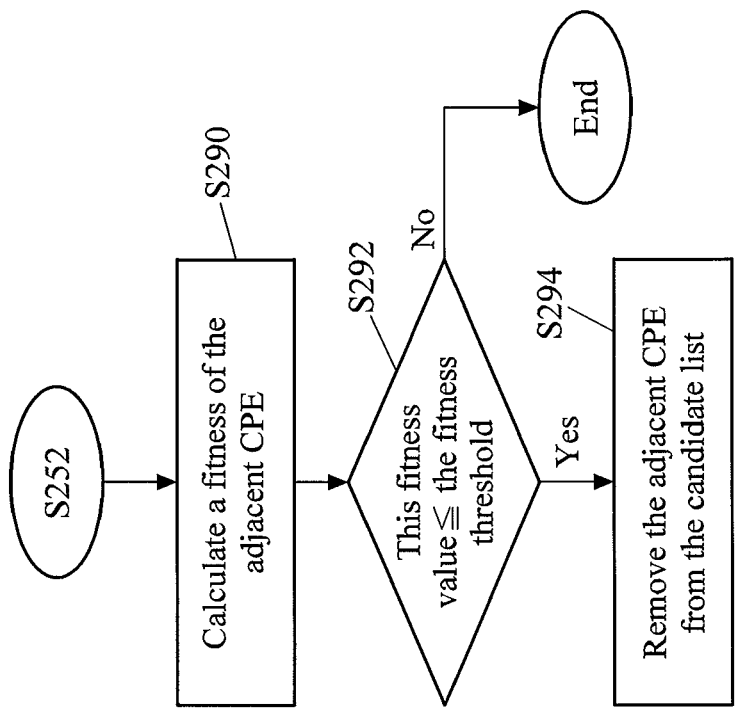
FIG. 12 is a flowchart of a management method of CPEs according to an embodiment of the disclosure.

In order to check whether the adjacent CPE 76 still has the capacity to work as the sub server 60 in the corresponding management group 50 after taking over the management of the new CPE 70, the extension procedure further includes the steps S290 to S294 after the step S52, as shown in FIG. 12. After the adjacent CPE 76 starts to manage the new CPE 70, the group management module 32 calculates the current fitness value of the adjacent CPE 76 (step S290) and determines whether the current fitness value of the adjacent CPE 76 is less than or equal to the fitness threshold (step S292).

If the current fitness value of the adjacent CPE 76 is still greater than the fitness threshold, this means that the adjacent CPE 76 can be in the candidate list continuously. If the current fitness value of the adjacent CPE 76 is less than or equal to the fitness threshold, the ACS 30 will delete the adjacent CPE 76 from the candidate list (step S294). In an embodiment, although the adjacent CPE 76 has not been regarded as one candidate CPE, the adjacent CPE 76 still carry on its work as the same as what the sub server 60 does, to continuously manage the new CPE 70.

As set forth above, whenever receiving the online message, the group management module 32 in the ACS 30 will perform the extension procedure to add the new CPE 70 in the system, and then directly manage the new CPE 70 or select one suitable sub server 60 for managing the new CPE 70. In this and some embodiments, the extension procedure can add a suitable new group 72 as well for dynamically adjusting the network topology.

Moreover, the group management module 32 can perform a deleting procedure or an altering procedure to dynamically change the management groups 50 according to the loading of each sub server 60 or the connection state of each online CPE 40.

Figure 13B:
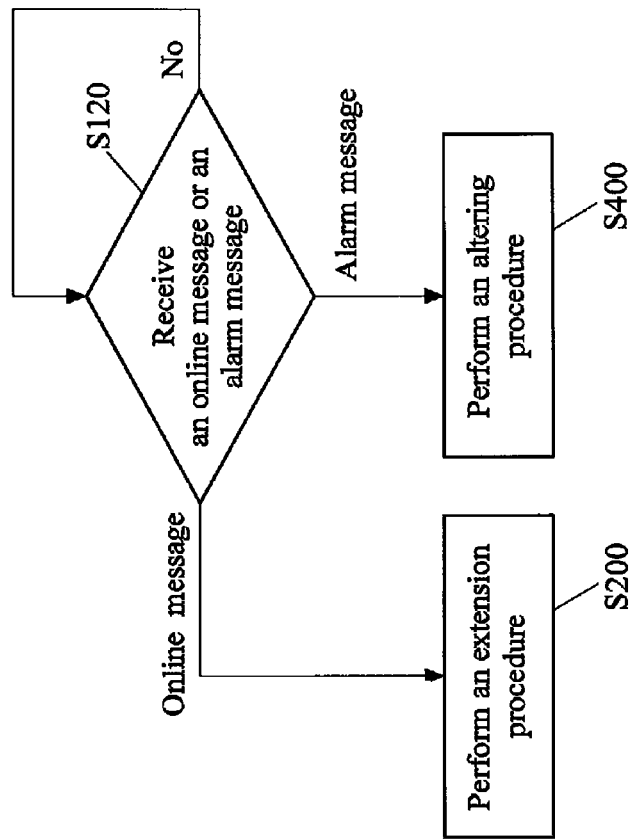
FIG. 13B is a flowchart of a management method of CPEs according to an embodiment of the disclosure.
Figure 13A:
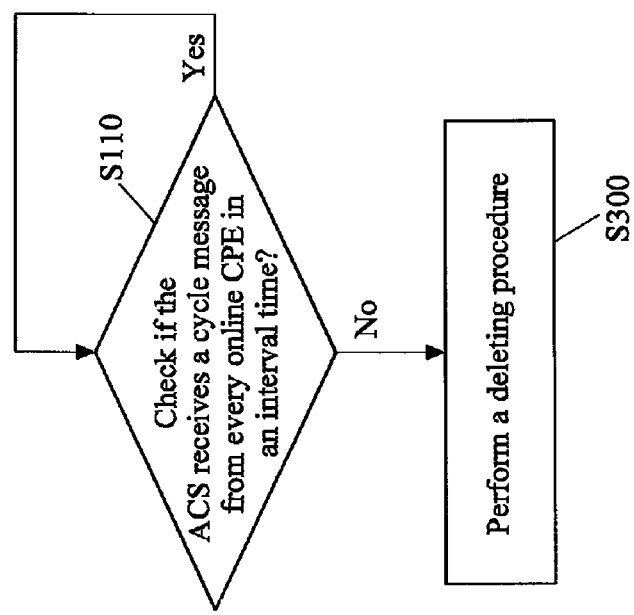
FIG. 13A is a flowchart of a management method of CPEs according to an embodiment of the disclosure.

FIG. 13A is a flowchart of a management method of CPEs according to an embodiment of the disclosure. The ACS 30 further determines whether any cycle message, which could be an inform message or a network connection request, is received from one of the online CPEs 40 in an interval time (step S110). If one cycle message is received from one online CPE 40 in the interval time, this means that this online CPE 40 is still available or alive. Herein, the ACS 30 can dispose a timer to every online CPE 40 to determine whether any online CPE 40 does not send the cycle message to the ACS 30 in the interval time. If not receiving the cycle message from any online CPE 40 in the interval time, the ACS 30 sets this online CPE 40 as an off-line CPE, and performs a deleting procedure to delete the off-line CPE from the ACS management list.

FIG. 13B is a flowchart of a management method of CPEs according to an embodiment of the disclosure. The ACS 30 can determine whether any online message or any alarm message is received (step S120). If receiving an online message from the new CPE 70, the ACS 30 will perform the extension procedure (step S200). If receiving an alarm message from an overload server, the ACS 30 will perform the altering procedure (step S400). The above steps S110 and S120 can be performed simultaneously for the ACS 30 to determine whether to perform the extension procedure, the deleting procedure or the altering procedure.

After performing the extension procedure, the deleting procedure or the altering procedure, the ACS 30 can send the management command to the online CPEs 40 which the ACS 30 directly manages. Alternately, the ACS 30 can send the management command to all the sub servers 60, so these sub servers 60 further transfer the management command to all the online CPEs 40 in their management group 50.

Figure 14:
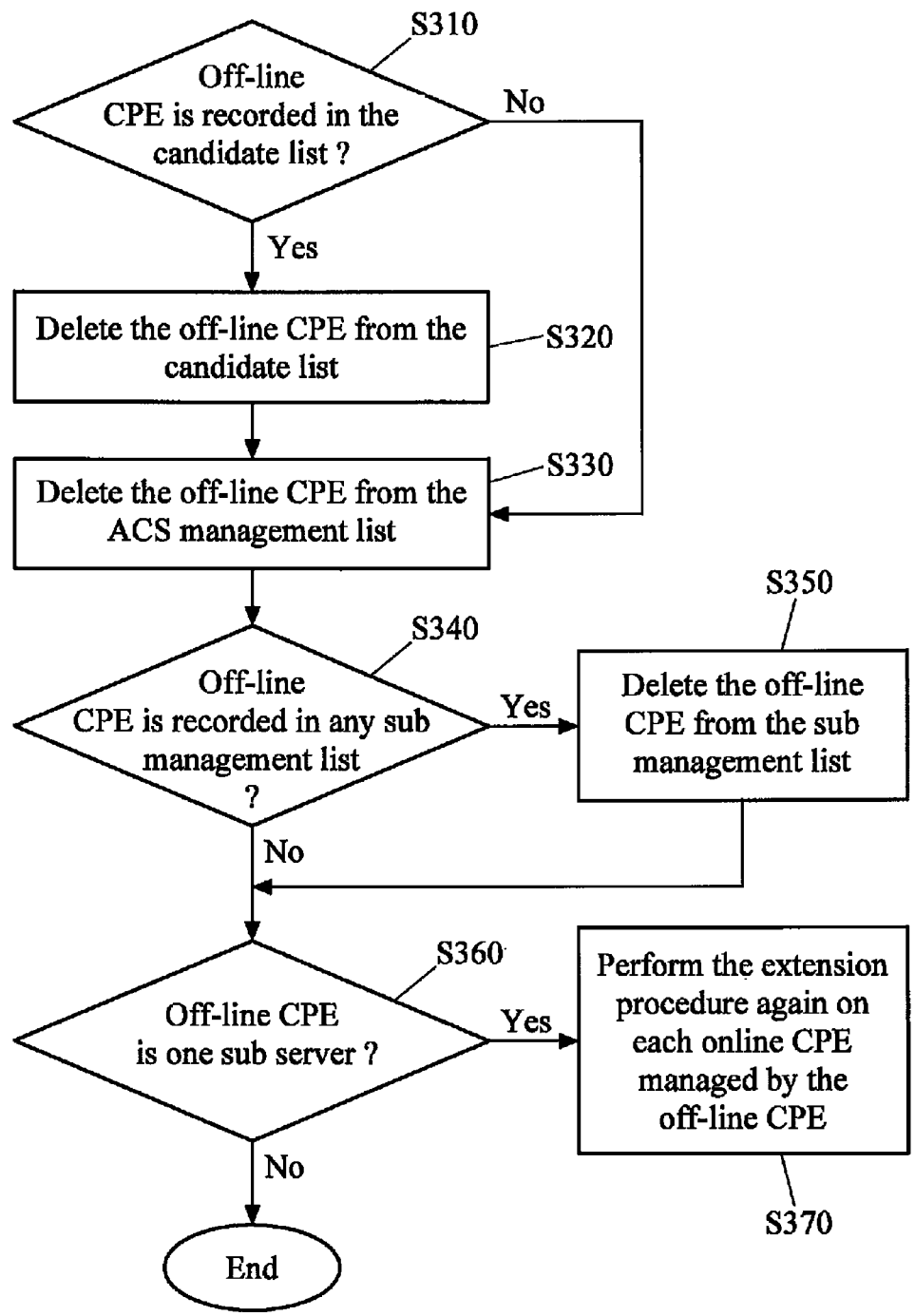
FIG. 14 is a flowchart of a deleting procedure according to an embodiment of the disclosure.

FIG. 14 is a flowchart of a deleting procedure according to an embodiment of the disclosure. Firstly, the group management module 32 determines whether an off-line CPE is recorded in the candidate list (step S310). If the off-line CPE has been recorded in the candidate list, the group management module 32 would delete the off-line CPE from the candidate list (step S320) and delete the off-line CPE from the ACS management list as well (step S330). In the same way, the group management module 32 can determine whether the off-line CPE is recorded in any sub management list (step S340). If the off-line CPE has been recorded in one of the sub management lists, the group management module 32 would delete the off-line CPE from this sub management list (step S350).

Figure 15B:
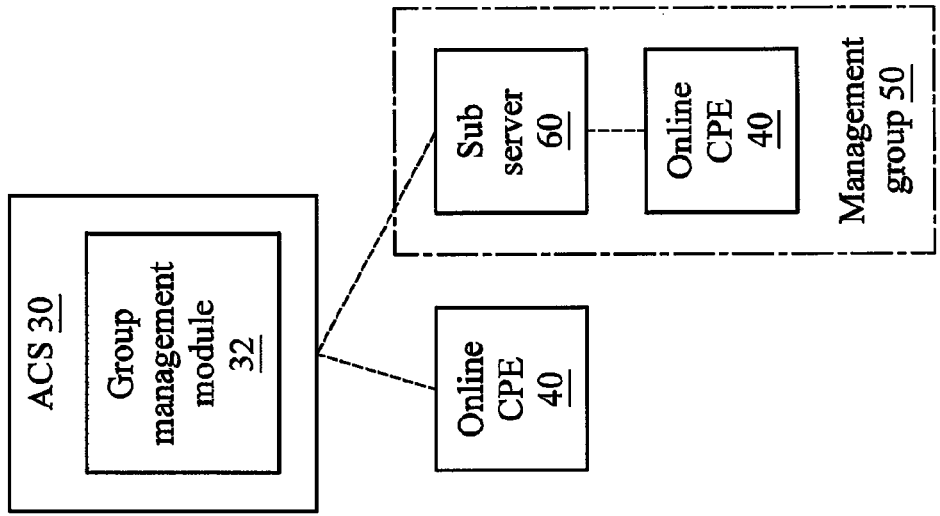
FIG. 15A and FIG. 15B show a schematic management diagram of an off-line CPE according to an embodiment of the disclosure.
Figure 15A:
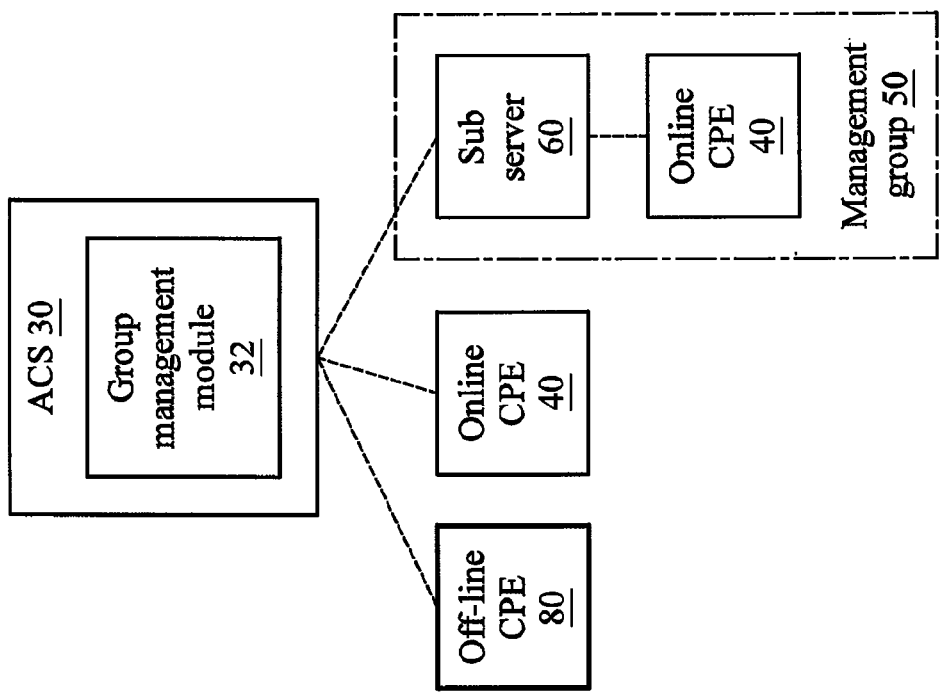
Figures 16A, 16B:
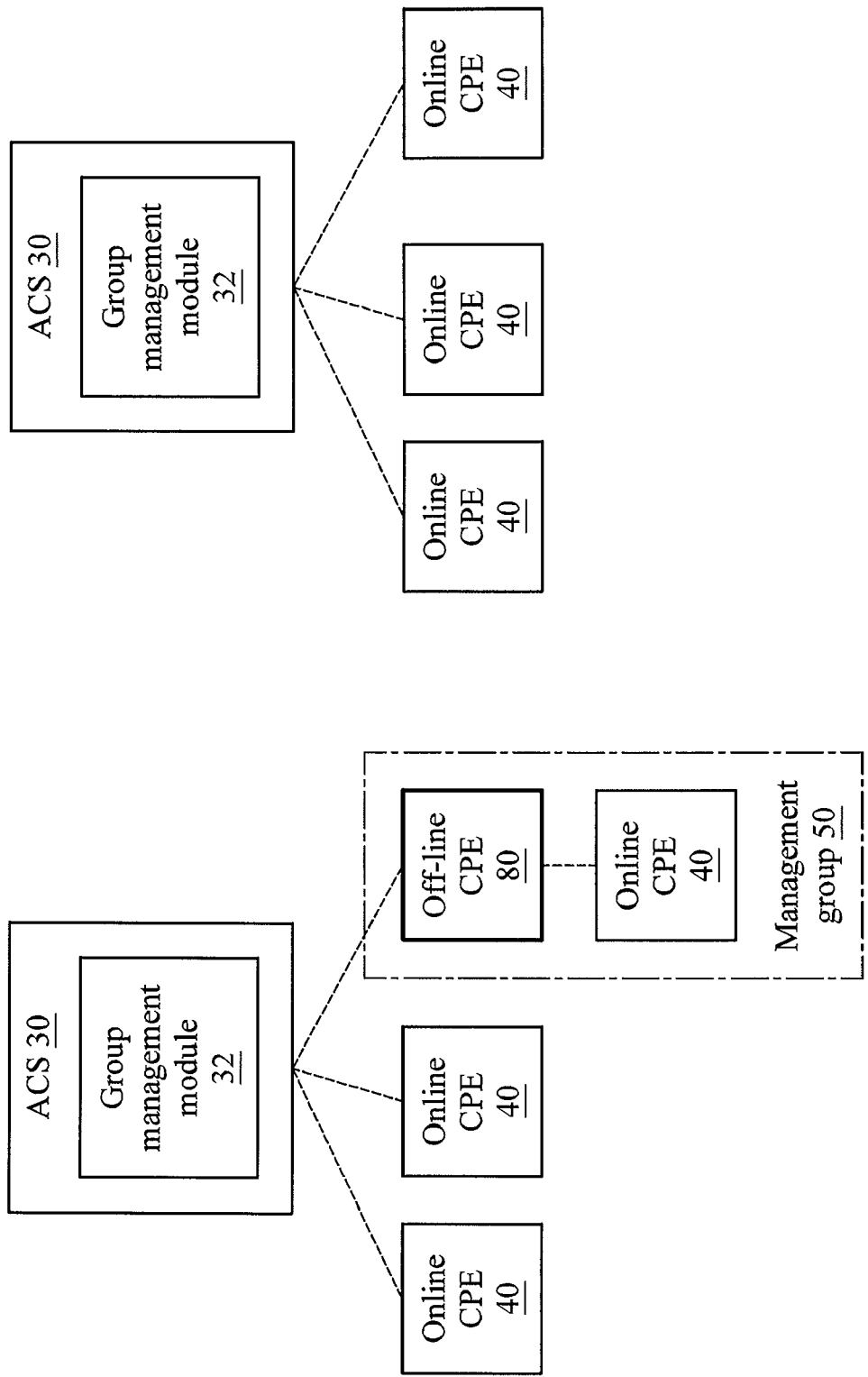
FIG. 16A and FIG. 16B show a schematic management diagram of an off-line CPE according to an embodiment of the disclosure.

Subsequently, the group management module 32 determines whether the off-line CPE is one of the existed sub servers 60 (step S360). If the off-line CPE 80 is one existed sub server 60, the deleting procedure is performed by performing the above steps S310 to S350, as shown in FIG. 15A and FIG. 15B. For example, if the off-line CPE 80 is one sub server 60, the group management module 32 has to perform the extension procedure again on each online CPE 40 managed by the off-line CPE 80 again (step S370), for managing the online CPEs 40 by a more suitable parent node instead of the off-line CPE 80, as shown in FIG. 16A and FIG. 16B.

Figure 17:
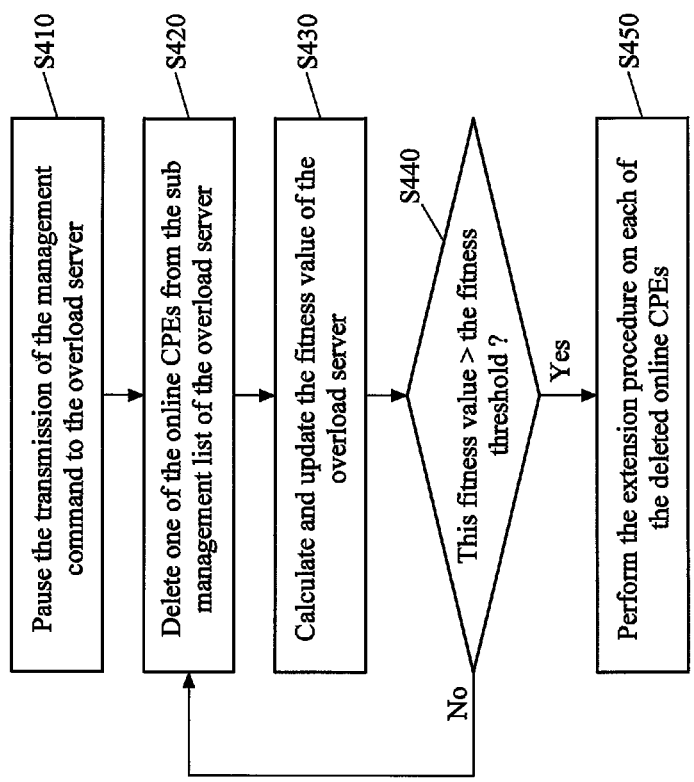
FIG. 17 is a flowchart of an altering procedure according to an embodiment of the disclosure.

FIG. 17 is a flowchart of an altering procedure according to an embodiment of the disclosure. Every sub server 60 can define its fitness value, and when its fitness value is less than or equal to the health threshold, actively sends an alarm message to the ACS 30. When the ACS 30 receives the alarm message from one sub server 60, the ACS 30 sets this sub server 60 as an overload server and performs the altering procedure on this overload server.

In the altering procedure, the group management module 32 pauses the transmission of the management command to the overload server (step S410), for avoiding missing the management command. In order to reduce the loading of the overload server, the group management module 32 will delete one of the online CPEs 40 from the sub management list of the overload server (step S420). The group management module 32 then recalculates and updates the fitness value of the overload server (step S430), and determines whether the fitness value of the overload server is greater than the fitness threshold (step S440). The group management module 32 performs the extension procedure on each of the deleted online CPEs 40 (step S450) to let the ACS 30 manage the deleted online CPE 40 or let the sub server 60 except for the overload server manage the deleted online CPE 40.

When the fitness value of the overload server is still less than or equal to the fitness threshold, the group management module 32 returns to the step S420, for deleting one more online CPE 40 from its management group 50 and then determining whether the fitness value of the overload server is restored to be greater than the fitness threshold.

Figure 18B:
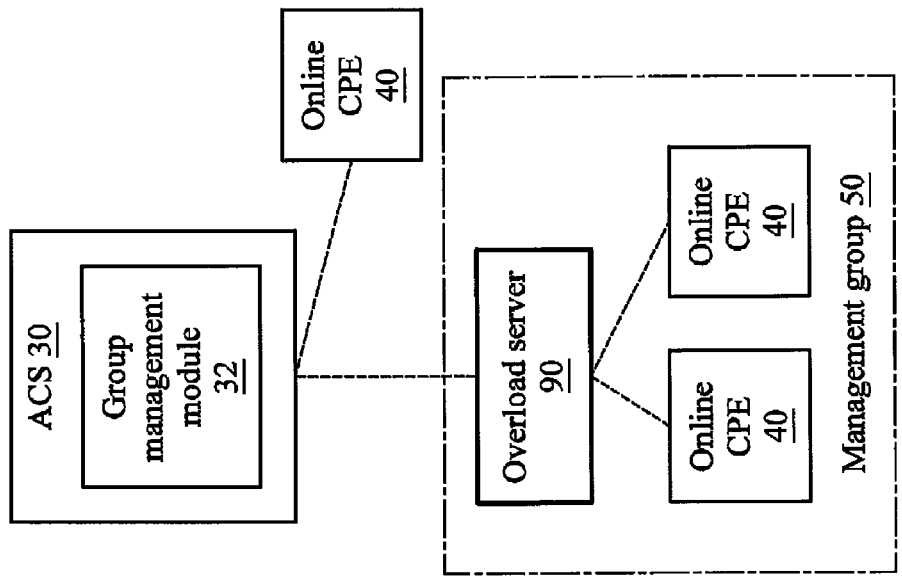
FIG. 18A to FIG. 18C show a schematic management diagram of an overload server according to an embodiment of the disclosure.
Figure 18A:
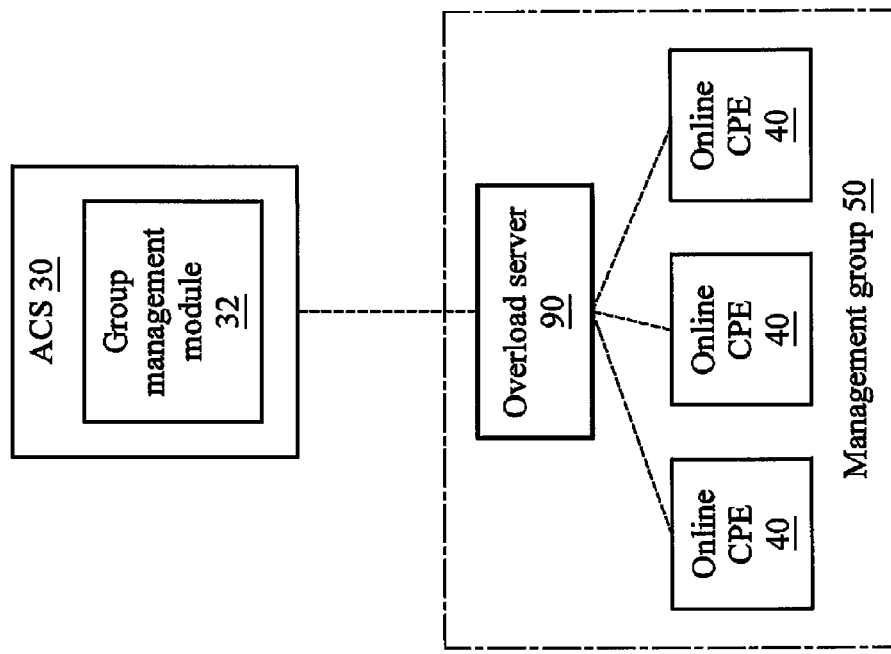
Figure 18C:
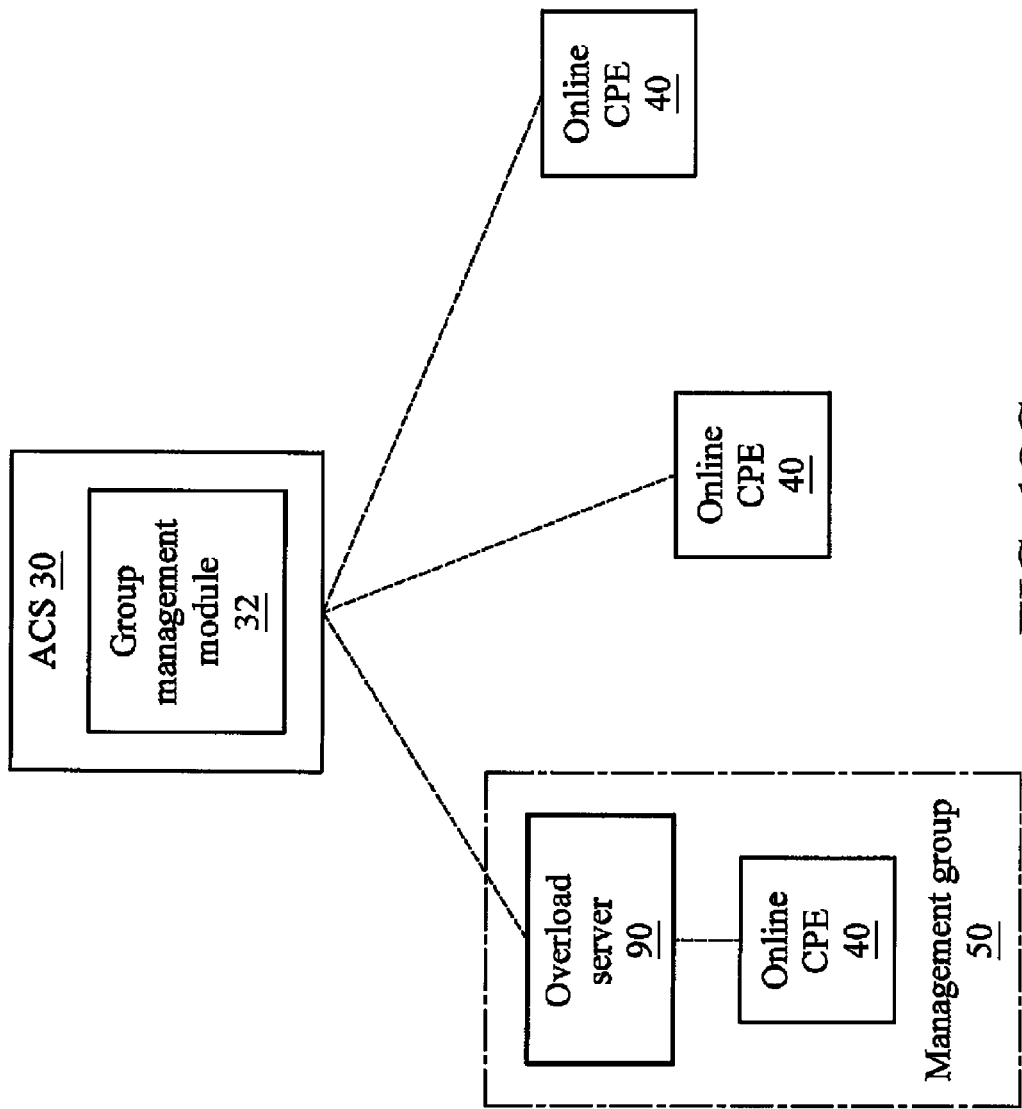

FIG. 18A to FIG. 18C show a schematic management diagram of an overload server according to an embodiment of the disclosure. The group management module 32 can delete the online CPEs 40 one by one from the management group 50 that the overload server 90 belongs to, and newly adds the deleted online CPE 40 in the system. As shown in FIG. 18B and FIG. 18C, the ACS 30 takes over the direct management of the deleted online CPE 40.

Accordingly, the ACS 30 sets the online CPE 40 having the better processing capacity, to be one sub server 60, and assigns every sub server 60 to manage other parts of the online CPEs 40. If the ACS 30 needs to send a management command to each of a great deal of online CPEs 40 having the same data model, the ACS 30 can send a group of management commands to the sub servers 60 corresponding to the data model, and then these sub server 60 can automatically transfer the group of management commands to all the appointed online CPEs 40. If the online CPE 40 wants to send data to or reply the ACS 30, the data or the response can be collected by the corresponding sub server 60 and then be transferred to the ACS 30. In this way, the ACS 30 can only maintain one connection between itself and the sub server 60 and then simultaneously control many online CPEs 40, thereby increasing a quantity of syn-online CPEs (i.e. online CPEs 40) much more.

Figure 19:
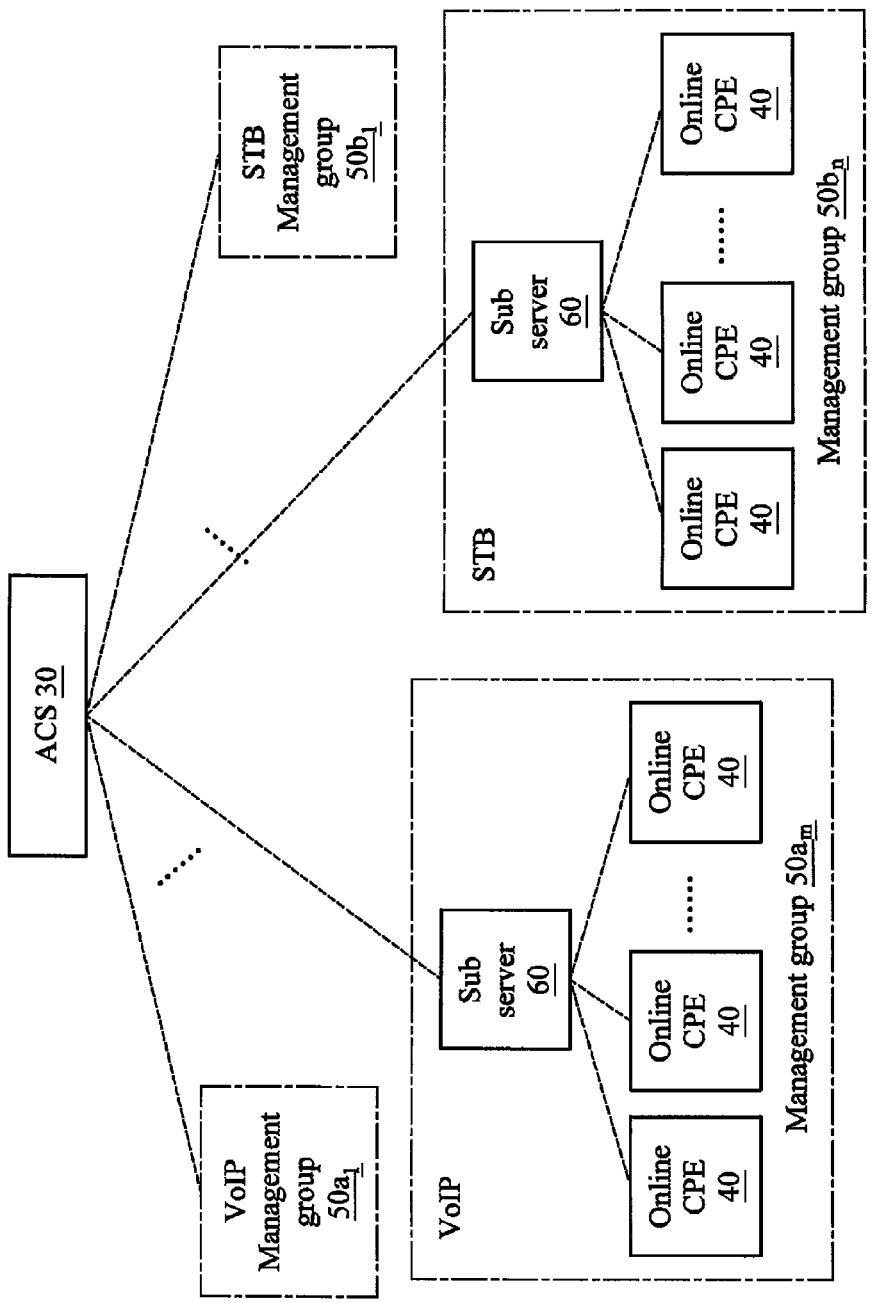
FIG. 19 is a schematic diagram of management groups according to an embodiment of the disclosure.

Refer to FIG. 19, the ACS 30 has m management groups, i.e. the management groups $50a_1$ to $50a_m$ corresponding to the VoIP devices, and n management groups, i.e. the management groups $50b_1$ to $50b_n$ corresponding to the set-top boxes (STBs), where m and n are positive integers. Assume that each of the management groups $50a_1$ to $50b_n$ includes one sub server 60 and at least k online CPEs 40. In this example, the ACS 30 maintains only (m+n) connections to manage ((m+n)×(k+1)) online CPEs 40 of (m+n) sub servers 60.

Experimental simulation result for the ACS and the management method of CPEs is illustrated as follows. Assume that there are 1000 to 15000 CPEs connecting to the ACS. Hardware parameters of each CPE lay as follows, where every hardware parameter is not less than 0.

Assume that a processing capacity mean of CPU is 400 and the standard deviation of the Gaussian distribution is 60, where its unit is MHz. Assume that a memory mean is 64 and the standard deviation of the Gaussian distribution is 48, where its unit is MB. Assume that a network bandwidth mean is 4 and the standard deviation of the Gaussian distribution is 16, where its unit is Mbps. Assume that a quantity of Hubs or switches in the CPE network is 18 and the standard deviation of the Gaussian distribution is 3, where its unit is piece. Assume that an average online time mean of the online CPE is 24 and the standard deviation of the Gaussian distribution is 48, where its unit is hour and its minimum limitation is 0. If the online time is less than or equal to one hour, the online time rank value will be 0, and if the online time is longer than one hour but is less than or equal to 24 hours, the online time rank value will be 0.3. If the online time is longer than 24 hours and is less than or equal to 168 hours, i.e. one week, the online time rank value will be 0.6, and if the online time is longer than 168 hours, the online time rank value will be 0.9.

Moreover, in every unit time, assume that the resource consumptions of CPU, memory, and network bandwidth for getting on line once, are respectively 20 MHz, 1 MB and 4 KB when the ACS directly manages one online CPE. Assume that the resource consumptions of CPU, memory, and network bandwidth for getting on line once, are respectively 20 MHz, 1 MB and 5 KB when the ACS communicates with one sub server. Assume that the resource consumption of network bandwidth of the management group getting on line once is 5 KB and that the parameters of every online CPE under work are higher than their average value. Assume that one online CPE or one sub server which the ACE directly manages occupies one connection and that a maximum connection quantity of the ACS is 4000. Assume that the health threshold of the ACS is 0.5, that the distance threshold of the ACS is 15, that $W_{f1}$, $W_{f2}$, $W_{f3}$ and $W_{f4}$ are 25%, i.e. 0.25, and that $W_{h1}$, $W_{h2}$ and $W_{h3}$ are 33.33%, i.e. 0.3333.

Figure 20:
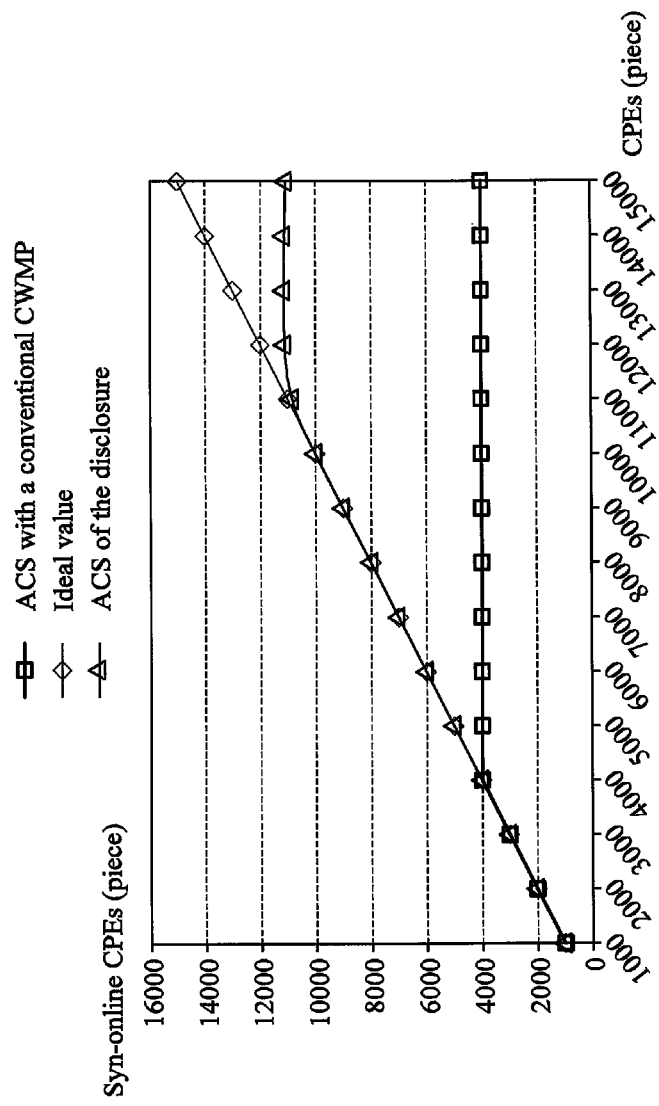
FIG. 20 is a schematic diagram showing a relation between the CPEs and the syn-online CPEs according to an embodiment of the disclosure.
Figure 21:
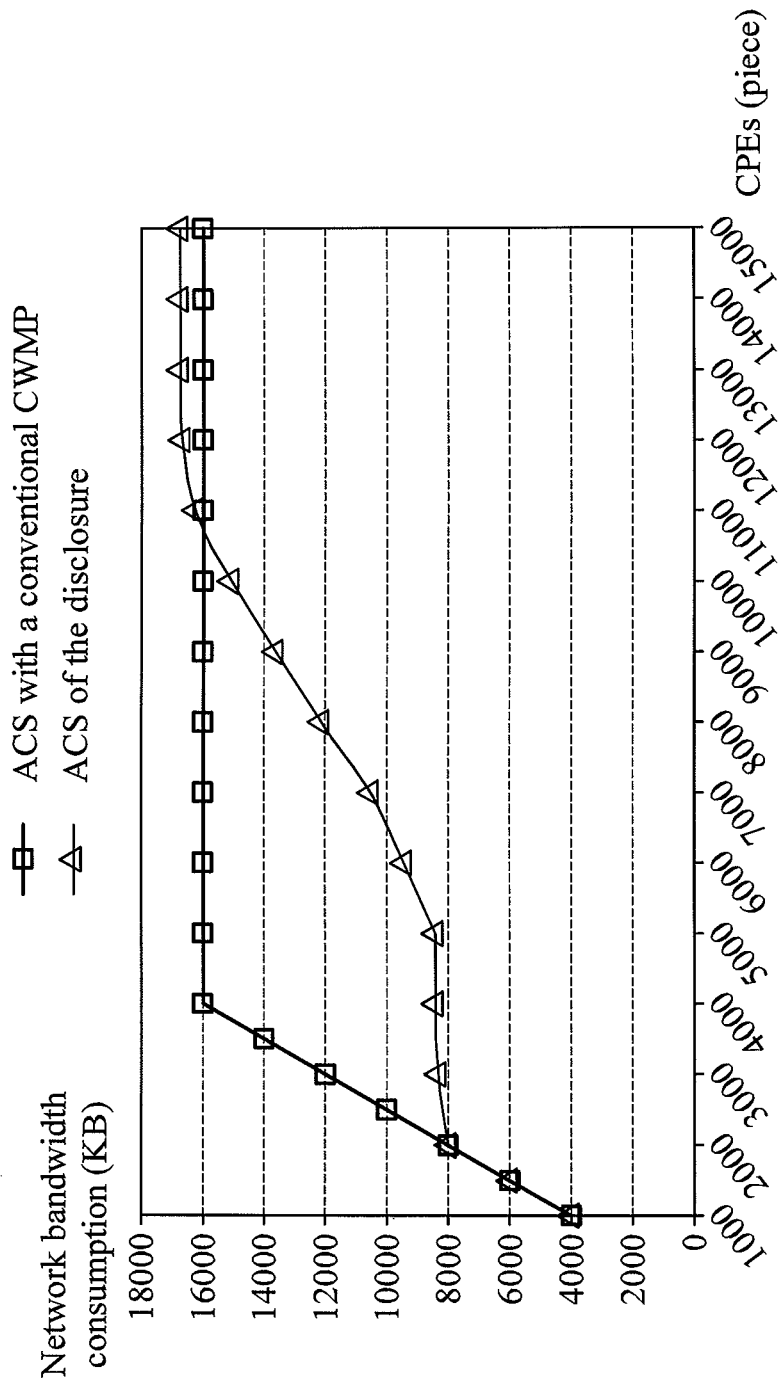
FIG. 21 is a schematic diagram showing a relation between the CPEs and the network bandwidth consumption according to an embodiment of the disclosure.

Then, the simulation result based on the above assumptions is shown in FIG. 20 and FIG. 21. An ACS under a conventional CWMP simultaneously manages only 4000 online CPEs because of its maximum connection limitation. Before a quantity of the managed online CPEs is up to the maximum limitation of the system, the network bandwidth consumption increases while the quantity of the managed online CPEs increases. As compared with the ACS under the conventional CWMP, the ACS in the disclosure can manage more online CPEs via the sub servers. There will be 11147 syn-managed online CPEs including the sub servers, and the accessing capability of the ACS in the disclosure is 2.78 times that of the ACS under the conventional CWMP. Moreover, before a quantity of the managed online CPEs is up to the maximum limitation of the system, the network bandwidth consumption may be efficiently suppressed during the management, thereby reducing the management loading of the ACS.

What is claimed is:

1. A management method of customer premises equipment (CPEs), adapted to manage a plurality of online CPEs via an auto-configuration server (ACS), and comprising steps of:
   performing an extension procedure when the ACS receives an online message from a new CPE, wherein the extension procedure comprises:
   calculating a health value of the ACS; and
   performing the following steps when the health value of the ACS is less than or equal to a health threshold:
      adding a new group of CPEs and a sub server which corresponds to the new group of CPEs; and
      managing the new CPE via the sub server corresponding to the new group of CPEs.

2. The management method according to claim 1, further comprising the following step of managing the new CPE via the sub server corresponding to the new group of CPEs:
   transmitting a management command to the sub server, and transferring the management command from the sub server to the new CPE in the new group of CPEs corresponding to the sub server.

3. The management method according to claim 1, wherein the online CPEs are grouped into a plurality of management groups according to a data model of each of the online CPEs by the ACS, each of the management groups comprises at least one of the online CPEs, and when a quantity of the at least one online CPE in one of the management groups is two, one of the online CPEs in the one of the management groups is set as a sub server which manages the other one of the online CPEs in the one of the management groups.

4. The management method according to claim 3, wherein the ACS maintains an ACS management list which records the management groups and parent nodes which correspond to the online CPEs, each of the parent nodes is either the ACS or one sub server, each of the sub server maintains a sub management list which records the online CPE managed by the sub server.

5. The management method according to claim 4, wherein the ACS management list records a fitness value of each of the online CPEs, the ACS maintains a candidate list which according to the management groups, respectively records whether each of the management groups corresponds to at least one candidate CPE which is one of the online CPEs, and the extension procedure further comprises:
   calculating the health value of the ACS; and
   performing the following steps when the health value of the ACS is less than or equal to the health threshold and the management group that the new CPE belongs to corresponds to the at least one candidate CPE:
      selecting an adjacent CPE from the at least one candidate CPE corresponding to the new CPE;
      adding the new group of CPEs and setting the adjacent CPE to be the sub server corresponding to the new group of CPEs when the adjacent CPE is not a sub server; and
      recording the new CPE into the ACS management list and into the sub management list maintained by the adjacent CPE, and managing the new CPE via the adjacent CPE.

6. The management method according to claim 5, wherein before the step of selecting the adjacent CPE from the at least one candidate CPE corresponding to the new CPE, the extension procedure further comprises:
   calculating the fitness value of the new CPE; and
   recording the new CPE into the candidate list when the fitness value of the new CPE is greater than a fitness threshold.

7. The management method according to claim 5, wherein the step of selecting the adjacent CPE from the at least one candidate CPE corresponding to the new CPE comprises:
   randomly selecting one of the at least one candidate CPE corresponding to the new CPE; and
   setting the selected candidate CPE to be the adjacent CPE when a distance between the selected candidate CPE and the new CPE is less than a distance threshold.

8. The management method according to claim 5, wherein after the step of recording the new CPE into the ACS management list and into the sub management list maintained by the adjacent CPE, and of managing the new CPE via the adjacent CPE, the extension procedure further comprises:
   calculating the fitness value of the adjacent CPE; and
   deleting the adjacent CPE from the candidate list when the fitness value of the adjacent CPE is less than or equal to the fitness threshold.

9. The management method according to claim 5, wherein the extension procedure further comprises:
   performing the following steps when the management group of the new CPE does not correspond to any candidate CPE:
      recording the new CPE into the ACS management list and directly managing the new CPE via the ACS when a current connection quantity of the ACS is less than a connection threshold; and storing the online message of the new CPE into a waiting queue when the current connection quantity of the ACS is greater than or equal to the connection threshold.

10. The management method according to claim 5, wherein the extension procedure further comprises:
recording the new CPE into the ACS management list and directly managing the new CPE via the ACS when the health value of the ACS is greater than the health threshold.

11. The management method according to claim 5, wherein the health value is calculated according to a memory usage, a central processing unit (CPU) usage, a bandwidth usage by the ACS, and calculates the fitness value of the new CPE or each of the online CPEs according to an online time rank value.

12. The management method according to claim 5, further comprising:
performing an altering procedure to change the parent node of an overload server and the parent node of the at least one online CPE which is managed by the overload server, when an alarm message is received from the overload server which is one of the sub servers.

13. The management method according to claim 12, wherein the ACS management list records a fitness value of each of the online CPEs, and the altering procedure comprises:
pausing the transmission of the management command to the overload server;
deleting one of the online CPE from the sub management list of the overload server;
calculating and updating the fitness value of the overload server;
performing an extension procedure on the deleted online CPE when the fitness value of the overload server is greater than a fitness threshold; and
deleting the overload server from the candidate list and returning to the step of deleting the one of the at least one online CPE from the sub management list of the overload server when the fitness value of the overload server is still less than or equal to the fitness threshold.

14. The management method according to claim 13, wherein the fitness value is calculated according to a memory usage, a CPU usage, a bandwidth usage and an online time rank value by the ACS.

15. The management method according to claim 4, further comprising:
performing a deleting procedure to delete the one of the online CPEs, which is set as an off-line CPE, from the ACS management list when no cycle message is received from the one of the online CPEs in an interval time.

16. The management method according to claim 15, wherein the ACS maintains a candidate list for recording whether each of the management groups corresponds to at least one candidate CPE which is one of the at least one online CPE in the corresponding management group, and the deleting procedure comprises:
deleting the off-line CPE from the candidate list while the off-line CPE is recorded into the candidate list;
deleting the off-line CPE from the ACS management list;
deleting the off-line CPE from one of the sub management lists while the off-line CPE has been recorded into the one of the sub management lists; and performing an extension procedure on each of the online CPEs managed by the off-line CPE when the off-line CPE is the sub server.

17. The management method according to claim 4, wherein the step of managing the new CPE via the sub server corresponding to the new group of CPEs comprises:
installing a sub server agent module into the sub server corresponding to the new group of CPEs;
establishing the sub management list of the sub server corresponding to the new group of CPEs according to the ACS management list; and
setting the parent node of the new CPE as the sub server corresponding to the new group of CPEs.

18. The management method according to claim 1, wherein the health value is calculated according to a memory usage, a CPU usage and a bandwidth usage.

19. The management method according to claim 1, wherein the ACS receives the online message through a CPE wide area network management protocol (CWMP) or a TR-069 standard protocol.

20. An auto-configuration server (ACS) for managing a plurality of online customer premises equipments (CPEs), comprising:
A hardware processor functioning as a group management module, configured to perform an extension procedure when the ACS receives an online message from a new CPE, and to perform the following steps in the extension procedure:
calculating a health value of the ACS; and
performing the following steps when the health value of the ACS is less than or equal to a health threshold:
adding a new group of CPEs and a sub server corresponding to the new group of CPEs; and
managing the new CPE via the sub server corresponding to the new group of CPEs.

21. The ACS according to claim 20, wherein the hardware processor also functions as a sub server communication module, configured to communicate with the sub server, and
wherein the hardware processor functioning as the group management module sends a management command to the sub server, corresponding to the new group of CPEs, via the hardware processor functioning as the sub server communication module, and then the sub server, corresponding to the new group of CPEs, transfers the management command to the CPE in the new group of CPEs.

22. The ACS according to claim 20, wherein the hardware processor functioning as the group management module groups the online CPEs into a plurality of management groups according to a data model of each online CPE, each of the management groups comprises at least one of the online CPEs, at least one online CPE of at least one of the management groups is set as a sub server which manages the rest of the online CPE in the management group corresponding to the sub server.

23. The ACS according to claim 22, further comprising:
a CPE database, configured to store an ACS management list, and
wherein the hardware processor functioning as the group management module maintains the ACS management list which records all the management groups and a parent node corresponding to each of the online CPEs and being either the ACS or one of the sub servers; and each of the sub servers maintains a sub management list which records the at least one online CPE managed by the sub server corresponding to the sub management list.

24. The ACS according to claim 23, wherein the ACS management list records a fitness value of each of the online CPEs, the CPE database stores a candidate list, the hardware processor functioning as the group management module maintains the candidate list which respectively records whether each of the management groups corresponds to at least one sub server and any candidate CPE which is one of the online CPEs, and the hardware processor functioning as the group management module further performs the following steps in the extension procedure:

calculating the health value of the ACS; and
performing the following steps when the health value of the ACS is less than or equal to the health threshold and the management group of the new CPE corresponds to at least one candidate CPE:
selecting an adjacent CPE from the at least one candidate CPE corresponding to the new CPE;
adding the new group of CPEs and setting the adjacent CPE as the sub server corresponding to the new group of CPEs when the adjacent CPE is not one sub server; and
recording the new CPE into the ACS management list and into the sub management list maintained by the adjacent CPE, and managing the new CPE via the adjacent CPE.

25. The ACS according to claim 24, wherein before the step of selecting the adjacent CPE from the at least one candidate CPE corresponding to the new CPE, the hardware processor functioning as the group management module further performs the following steps in the extension procedure:

calculating the fitness value of the new CPE; and
recording the new CPE into the candidate list when the fitness value of the new CPE is greater than a fitness threshold.

26. The ACS according to claim 24, wherein in the step of selecting the adjacent CPE from the at least one candidate CPE corresponding to the new CPE, the hardware processor functioning as the group management module performs the following steps:

randomly selecting one of the at least one candidate CPE corresponding to the new CPE; and
setting the selected candidate CPE as the adjacent CPE when a distance between the selected candidate CPE and the new CPE is less than a distance threshold.

27. The ACS according to claim 24, wherein after the step of recording the new CPE into the ACS management list and the sub management list which is maintained by the adjacent CPE, and of managing the new CPE via the adjacent CPE, the hardware processor functioning as the group management module further performs the following steps in the extension procedure:

calculating the fitness value of the adjacent CPE; and
deleting the adjacent CPE from the candidate list when the fitness value of the adjacent CPE is less than or equal to the fitness threshold.

28. The ACS according to claim 24, wherein the hardware processor functioning as the group management module further performs the following steps in the extension procedure:

performing the following steps when the management group of the new CPE does not correspond to any candidate CPE:

recording the new CPE into the ACS management list and directly managing the new CPE via the ACS when a current connection quantity of the ACS is less than a connection threshold; and
storing the online message of the new CPE into a waiting queue when the current connection quantity of the ACS is greater than or equal to the connection threshold.

29. The ACS according to claim 24, wherein the hardware processor functioning as the group management module further performs the following step in the extension procedure:

recording the new CPE into the ACS management list and directly managing the new CPE via the ACS when the health value of the ACS is greater than the health threshold.

30. The ACS according to claim 24, wherein the hardware processor functioning as the group management module calculates the health value according to a memory usage, a CPU usage, a bandwidth usage, and calculates the fitness value of the new CPE or each of the online CPEs according to an online time rank value.

31. The ACS according to claim 24, wherein when receiving an alarm message from an overload server which is one of the sub servers, the hardware processor functioning as the group management module performs an altering procedure to change the parent node of the overload server and the parent node of the at least one online CPE managed by the overload server.

32. The ACS according to claim 31, wherein the ACS management list records a fitness value of each of the online CPEs, and the hardware processor functioning as the group management module performs the following steps in the altering procedure:

pausing the transmission of the management command to the overload server;
deleting one of the at least one online CPE from the sub management list of the overload server;
calculating and updating the fitness value of the overload server;
performing an extension procedure on the deleted online CPE when the fitness value of the overload server is greater than a fitness threshold; and
deleting the overload server from the candidate list and returning to the step of deleting the one of the at least one online CPE from the sub management list of the overload server when the fitness value of the overload server is still less than or equal to the fitness threshold.

33. The ACS according to claim 32, wherein the hardware processor functioning as the group management module calculates the fitness value according to a memory usage, a CPU usage, a bandwidth usage and an online time rank value.

34. The ACS according to claim 23, wherein when the ACS does not receive any cycle message from one of the online CPEs in an interval time, the hardware processor functioning as the group management module sets the one of the online CPEs to be an off-line CPE and performs a deleting procedure to delete the off-line CPE from the ACS management list.

35. The ACS according to claim 34, wherein the ACS maintains a candidate list which records whether each of the management groups corresponds to at least one sub server and any candidate CPE which is one of the at least one online CPE in the corresponding management group, and the hardware processor functioning as the group management module performs the following steps in the deleting procedure:

deleting the off-line CPE from the candidate list while the off-line CPE has been recorded in the candidate list;

deleting the off-line CPE from the ACS management list;

deleting the off-line CPE from one of the sub management lists when the off-line CPE has been recorded in the one of the sub management lists; and performing an extension procedure on each of the online CPEs managed by the off-line CPE when the off-line CPE is the sub server.

36. The ACS according to claim 23, wherein in the step of managing the new CPE via the sub server corresponding to the new group of CPEs, the hardware processor functioning as the group management module performs the following steps:

installing a function of a sub server agent module into the sub server corresponding to the new group of CPEs;

establishing the sub management list of the sub server corresponding to the new group of CPEs, according to the ACS management list; and setting the parent node of the new CPE as the sub server corresponding to the new group of CPEs.

37. The ACS according to claim 20, wherein the ACS calculates the health value according to a memory usage, a CPU usage and a bandwidth usage.

38. The ACS according to claim 20, wherein the hardware processor functioning as the group management module receives the online message from the new CPE through a CWMP or a TR-069 standard protocol.

* * * * *